US011317371B1

(12) United States Patent
Vatidis et al.

(10) Patent No.: US 11,317,371 B1
(45) Date of Patent: Apr. 26, 2022

(54) SCHEDULING ALLOCATION OF RESOURCES TO A NUMBER OF DEVICES BASED ON TIME AND LOCATION

(71) Applicant: Hubstar International Limited, London (GB)

(72) Inventors: Stefanos Vatidis, London (GB); Denis Mequinion, London (GB)

(73) Assignee: Hubstar International Limited, London (GB)

( * ) Notice: Subject to any disclaimer, the term of this patent is extended or adjusted under 35 U.S.C. 154(b) by 0 days.

(21) Appl. No.: 17/364,355

(22) Filed: Jun. 30, 2021

(51) Int. Cl.
*H04W 64/00* (2009.01)
*G01S 5/02* (2010.01)
*H04W 4/029* (2018.01)

(52) U.S. Cl.
CPC ......... *H04W 64/006* (2013.01); *G01S 5/0284* (2013.01); *H04W 4/029* (2018.02)

(58) Field of Classification Search
CPC ......... H04W 64/00; H04W 4/00; H04W 4/02; H04W 4/021; H04W 4/029; H04W 72/048; H04W 16/14; H04W 72/1273; H04W 72/0486; H04W 72/00; H04W 72/02; H04W 72/04; H04W 72/044; H04W 72/1263; H04W 72/1205; H04W 72/12; H04W 76/00; H04W 4/06; H04W 4/08; H04W 72/06; H04W 16/00; H04W 16/20; H04W 28/00; H04W 28/16; H04W 28/26; H04W 72/08; H04W 72/0493; H04W 72/005; H04W 88/00; H04W 88/03; H04W 88/08; H04W 88/18; H04W 28/0908; H04W 76/38; H04W 24/10; H04W 74/00; H04W 74/002; H04W 74/006; H04W 74/04; H04W 74/06; H04W 84/06; H04W 88/02; H04W 4/42; G01S 5/00; G01S 5/02; H04B 7/185; H04B 7/18506; H04B 1/713; H04B 1/7143; H04B 17/382; H04B 7/18502; H04B 7/18504; H04B 7/18508; H04L 27/26; H04L 27/2601; H04L 27/2666
See application file for complete search history.

(56) References Cited

U.S. PATENT DOCUMENTS 10,600,013 B2 3/2020 Koppel et al.
2012/0263089 A1* 10/2012 Gupta et al. .................. 370/312
2016/0316323 A1* 10/2016 Situ et al. ............... H04W 4/02
(Continued)

*Primary Examiner* — Meless N Zewdu
(74) *Attorney, Agent, or Firm* — Dority & Manning, P.A.

(57) ABSTRACT

A computer-implemented method comprising: determining a respective location of each of one or more client devices at a given time, comprising, for each of the one or more client devices: estimating a location of the client device at the given time, comprising: receiving an indication that one or more detectors of a plurality of detectors received one or more wireless signals from the client device at the given time; and estimating the location of the client device based on respective locations of each of the one or more detectors; obtaining an indication of a scheduled allocation of one or more resources at or within a predetermined range of the given time; determining that the estimated location of the client device is proximate to a usage location of the one or more resources; and determining the location of the client device at the given time based on the usage location.

20 Claims, 7 Drawing Sheets

(56) References Cited

U.S. PATENT DOCUMENTS

| | | | |
|---|---|---|---|
| 2017/0026308 A1* | 1/2017 | Reagon et al. | H04L 47/70 |
| 2017/0048754 A1* | 2/2017 | Ely et al. | H04W 28/20 |
| 2019/0086212 A1* | 3/2019 | Koshy et al. | G01C 21/206 |
| 2019/0108467 A1* | 4/2019 | Koppel et al. | G06Q 10/06315 |
| 2019/0306082 A1* | 10/2019 | Horvath et al. | H04L 47/826 |
| 2019/0335294 A1* | 10/2019 | Sorden et al. | |
| 2020/0259896 A1* | 8/2020 | Sachs et al. | H04L 67/1046 |
| 2021/0182756 A1* | 6/2021 | Feng et al. | G06Q 10/06315 |

* cited by examiner

```
                                    500
                                      ↘

┌──────────────────────────────────────────────────────────────────┐
  │              For Each of a Plurality of Client Devices 510        │
  │   ╭──────────────────────────────────────────────────────────╮    │
  │   │  Determine or Estimate the Location of the Client Device 512 │ │
  │   ╰──────────────────────────────────────────────────────────╯    │
  └──────────────────────────────────────────────────────────────────┘
                                      ↓

╭──────────────────────────────────────────────────────────────────╮
  │  Calculate a Number of Users of a Shared Resource based on the    │
  │  Determined or Estimated Locations of the Plurality of Client     │
  │  Devices and a Scheduled Allocation of the Shared Resource to a   │
  │  First One or More Users at the Given Time or Within a            │
  │  Predetermined Range of the Given Time                            │
  │                              520                                  │
  │   ╭──────────────────────────────────────────────────────────╮    │
  │   │ Determine whether a First One or More Client Devices of   │   │
  │   │ a Second One or More Users of the First One or More Users│   │
  │   │    are Proximate to a Usage Location of the Shared        │   │
  │   │                     Resource                              │   │
  │   │                       522                                 │   │
  │   ╰──────────────────────────────────────────────────────────╯    │
  │                              ↓                                    │
  │   ╭──────────────────────────────────────────────────────────╮    │
  │   │ In Response to a Positive Determination, Determining that │   │
  │   │   the Second One or More Users are Using the Shared       │   │
  │   │                     Resource                              │   │
  │   │                       524                                 │   │
  │   ╰──────────────────────────────────────────────────────────╯    │
  │                                                                   │
  │   ╭──────────────────────────────────────────────────────────╮    │
  │   │ Determine whether a Second One or More Client Devices of  │   │
  │   │    a Third One or More Users are Proximate                │   │
  │   │      to a Usage Location of the Shared Resource           │   │
  │   │                       526                                 │   │
  │   ╰──────────────────────────────────────────────────────────╯    │
  │                              ↓                                    │
  │   ╭──────────────────────────────────────────────────────────╮    │
  │   │ In Response to a Positive Determination, Determining that │   │
  │   │   the Third One or More Users are Using the Shared        │   │
  │   │                     Resource                              │   │
  │   │                       528                                 │   │
  │   ╰──────────────────────────────────────────────────────────╯    │
  ╰──────────────────────────────────────────────────────────────────╯
                                      ↓

╭──────────────────────────────────────────────────────────────────╮
  │          Determine Whether the Number of Users of the             │
  │         Shared Resource Exceeds or is at a Threshold              │
  │                              530                                  │
  ╰──────────────────────────────────────────────────────────────────╯
                                      ↓

╭──────────────────────────────────────────────────────────────────╮
  │ In Response to Determining that the Number of Users Exceeds or is │
  │  at the Threshold, Providing an Indication that the Number of     │
  │            Users is at or Exceeds the Threshold                   │
  │                              540                                  │
  ╰──────────────────────────────────────────────────────────────────╯
```

FIG. 5

SCHEDULING ALLOCATION OF RESOURCES TO A NUMBER OF DEVICES BASED ON TIME AND LOCATION

TECHNICAL FIELD

The present disclosure relates to systems and methods for determining locations. In particular, but without limitation, this disclosure relates to systems and method for determining locations of client devices.

BACKGROUND

Location determination systems facilitate the locating of entities, e.g. client devices or users. Location determination systems may utilize wireless hardware and signals already present for providing other functions, e.g. providing wireless network access. For example, location determination systems may utilize wireless (e.g. Wi-Fi) routers to detect signals received from client devices such as mobile phones or laptops and determine the location of the client devices based on these wireless signals. These systems can allow "passive" location determination, as they can determine location based on signals not specifically intended for location detection (e.g. Wi-Fi communication signals) and do not require specialist location detection hardware. However, such systems utilizing wireless hardware and signals already present for providing other functions have limited precision and accuracy. Such limited precision and accuracy may be caused by interference and absorption of the wireless signals in the environment.

Location determination systems utilizing specialized hardware in client devices are also available, e.g. location determination systems utilizing Global Navigation Satellite Systems (GNSS), such as the Global Positioning System (GPS) and Galileo. However, the precision and accuracy of such systems is limited, particularly in indoor environments. In addition, these systems require the client devices to be specially configured for location determination. Hence, there is a need to improve the precision and accuracy of location determination systems.

SUMMARY

Aspects described herein improve the determination of locations of client devices by utilizing predefined scheduled allocations of resources. These improvements result in an improvement in the accuracy and/or precision of the determined locations of the client devices by making use of advanced knowledge of the expected location of the device based on the predefined scheduled allocation of resources.

According to a first aspect, there is provided a system for determining a location of one or more client devices, comprising: a plurality of detectors for detecting the presence of one or more client devices based on wireless signals received from the one or more client devices, wherein each of the plurality of detectors is mapped to a respective location; and one or more computing devices configured to: determine a respective location of each of the one or more client devices at a given time, comprising, for each of the one or more client devices: estimating a location of the client device at the given time, comprising: determining whether one or more detectors of the plurality of detectors received one or more wireless signals from the client device at the given time; and in response to determining that the one or more detectors received the one or more wireless signals at the given time, estimating the location of the client device at the given time based on the respective locations of the one or more detectors; obtaining an indication of a predefined scheduled allocation of one or more resources at the given time or within a predetermined range of the given time, wherein the scheduled allocation indicates a usage location of the one or more resources; determining whether the estimated location of the client device is proximate to the usage location of the one or more resources; and in response to determining that the estimated location of the client device is proximate to the usage location, determining the location of the client device at the given time based on the usage location.

A scheduled allocation of one or more resources indicates that one or more client devices are likely to be present at a usage location of the one or more resources at or within a predetermined range of the given time. Thus, it can be determined that a client device which is proximate to said usage location at or within the predetermined range of the given time is located at or near the usage location of the one or more allocated resources, as the user of the client device, and hence the client device itself, will be present at or near said usage location. The usage location of the one or more resources may be more accurate than the estimated location, e.g. the one or more resources may be accurately mapped. Thus, by using the usage location of the one or more resource, a more accurate location of the client device is determined. The usage location of the one or more resources may be more precise than the estimated location, as the precision of the estimated location is limited by the number of detectors receiving signals from the one or more client devices and the properties and nature of these signals. The usage location of the one or more resources may be known precisely, e.g. the one or more resources may be precisely mapped.

Indications of scheduled allocations of resources are readily available in many contexts, e.g. through resource booking systems such as room, desk or computer booking systems. Hence, improvements to the determinations of locations may be made using pre-existing data.

Determining the location of the client device at the given time based on the usage location may include determining that the location of the client device is the usage location.

The usage location of the one or more resources may be the location of the one or more resources.

The predetermined range may comprise an arrival time interval.

Using a predetermined range comprising an arrival time interval facilitates the determination of the location of the client device at a given time before the time of the scheduled allocation of the one or more resources. Such an arrival time interval may be a predetermined interval of time within which a user of a client device is expected to arrive at or near the usage location of the one or more resources before the start of the allocation. This is beneficial as users of client devices often depart the usage location of the one or more resources before the start time of the scheduled allocation, e.g. a user of a client device may arrive at the usage location of the one or more resources before the time of the scheduled allocation to prepare to use the one or more resources. The predetermined interval of time may be of any suitable length, e.g. between five minutes and an hour. The predetermined interval of time may depend on the type of the one or more resources and/or the length of the scheduled allocation.

The predetermined range may comprise a departure time interval.

Using a predetermined range comprising a departure time interval facilitates the determination of the location of the client device at a given time after the time of the scheduled allocation of the one or more resources. Such a departure time interval may be a predetermined interval of time within which a user of a client device is expected to leave the usage location of the one or more resources after the end of the scheduled allocation. This is beneficial as users of client devices often depart the usage location of the one or more resources after the end time of the scheduled allocation, e.g. a user of a client device may depart the usage location of the one or more resources after the end time of the scheduled allocation due to using the resource for a longer period than scheduled. The predetermined interval of time may be of any suitable length, e.g. between five minutes and an hour. The predetermined interval of time may depend on the type of the one or more resources and/or the length of the scheduled allocation.

The given time may be a given time period (that is, the one or more wireless signals may be received over a given time period and need not be received at precisely the same time).

The precision of the determined location may be based on a size of at least one of the one or more resources. The precision of the determined location may be based on a size of the usage location of the one or more resources.

The size of at least one of the one or more resources and/or the size of the usage location of the one or more resources can provide an accurate indication of how precisely the determined location is known. Providing an accurate indication of the precision of the determined location is beneficial as a person receiving such an indication of precision may know that to find the client device or a user thereof, an area in accordance with the precision is to be searched. For example, where the one or more resources comprise a conference hall, the precision of the determined location may be in accordance with the size of the conference hall and the person may know to search the conference hall. If the precision is indicated to be known more precisely than it actually is then the person may search too small an area for the client device and/or the user thereof, and, hence be unable to locate the client device and/or the user thereof. Whereas, if the precision is indicated to be known less precisely than it actually is then the person may search too large an area for the client device and/or the user thereof, hence wasting their time and energy.

The one or more detectors may comprise one or more wireless access points. The one or more wireless access points may comprise one or more wireless local area network access points. The one or more wireless access points may comprise one or more Wi-Fi access points.

Using wireless access points as detectors is beneficial as wireless access points are hardware that is readily available and many client devices are configured to emit wireless signals that can be received by such wireless access points.

The scheduled allocation of the one or more resources may be to a user of the client device.

Using a scheduled allocation that is to a user of the client device may improve the accuracy of the determination that the client device is at the usage location of the one or more resources. As the scheduled allocation is to the specific user associated with the client device, there can be a higher confidence that the user and hence the client device is at the usage location of the one or more resources if the client device of the user is proximate to the usage location at the given time. Furthermore, the amount of data to be retrieved, received or otherwise obtained when obtaining the indications of the scheduled allocations of one or more resources may be reduced, as indications of allocations of resources for that user specifically may be obtained rather than indications of allocations of resources in general.

The one or more resources may comprise a shared resource. The one or more computing devices may be further configured to calculate a number of users of the shared resource based on the determined locations of the one or more client devices.

Calculating the number of users of a shared resource facilitates prevention and/or remediation of exceeding the capacity of the shared resource. By monitoring the number of users of a shared resource, users can know not to or be prevented from exceeding the capacity of the shared resource. The capacity of the shared resource may be based on safety requirements, e.g. social distancing and/or fire safety protocols where the resource is a room or workspace. Thus, by not exceeding the capacity of the shared resource such safety requirements may be ensured and the safety of users enhanced. The capacity of the shared resource may also be a machine or other device whose likelihood of malfunction or breakdown is increased when used by more than a maximum number of users at the same time, e.g. manufacturing equipment or a multi-user computing device. Such calculation of the number of users can also allow users to determine when a shared resource has spare capacity.

The scheduled allocation may be to a plurality of users.

Using a scheduled allocation to a plurality of users may improve the calculation of the number of users of the shared resource, because the number of users to which the shared resource is allocated may be used to improve the accuracy of the calculation of the number of users. For example, the number of users to which the resource is allocated may be used as a baseline number of users with deviations from this based on the determined locations requiring the precision and/or confidence of the determined locations being above a threshold, e.g. due to a sufficiently precise estimated location.

At least one of the one or more client devices may be associated with a respective at least one of the plurality of users.

At least one of the one or more client devices being associated with a respective at least one of the plurality of users may improve the accuracy of the calculation of the number of users, as it can be determined with a greater confidence that this user is using the shared resource.

The calculation of the number of users of the shared resource may be based on the prior probability that the estimated locations of the one or more client devices are proximate to the usage location of the shared resource at or within the predetermined range of the given time. The background probability may be or be based on the probability that the estimated locations of the one or more client devices would be present at the usage location if not for the scheduled allocation. This may be based on historical estimated locations and/or historical wireless signals detected by the plurality of detectors for the one or more client devices.

The prior probability may be referred to as the background probability.

Using the prior probability that the estimated locations of the or more client devices are proximate to the usage location of the shared resource at or within the predetermined range of the given time may improve calculation of the number of users by improving the accuracy with which it can be determined that the respective user of the at least one of the one or more client devices is using the shared resource and is present at the usage location. If a user of a client device has a high prior probability of being proximate to the usage location in general and is not a user to which the shared resource has been explicitly allocated then it may be determined that they are not using the resource and are proximate to the usage location of the resource coincidentally. In contrast, if the user has a low probability of being proximate to the usage location in general then it may be determined that they are using the shared resource and are proximate to the usage location for the scheduled allocation.

The prior probability may be based on the number of client devices that are estimated to be proximate to the usage location (e.g. that have estimated locations proximate to the usage location). The prior probability of a larger number of client devices being proximate to the usage location by chance may be lower than that of a smaller number of client devices being proximate to the usage location by chance. Hence, if a larger number of client devices are proximate to the usage location are present then it may be determined that the client devices are there for the scheduled allocation of the shared resource and may be calculated as being users of the shared resource.

The prior probability distribution may be referred to as the background probability distribution.

The calculation of the number of users may be based on a prior probability distribution for the number of users of the shared resource. The prior probability distribution for the number of users may be based on the number of users to which the shared resource is allocated. The prior probability may be greatest for an expected number of users. For instance, a Gaussian or any other peaked distribution may be used, with a maxima at an expected number of users. The expected number of users may be equal to the number of users to which the shared resource is allocated. As another example, the expected number of users may be an amount or a proportion less than the number of users to which the shared resource is allocated as it may be expected that at least some users may not use the resource. For example, it may be expected that two users to which the shared resource is allocated may not use the shared resource, or it may be expected that 10% of the users to which the resource is allocated may not use the shared resource. The prior probability of other number of users may monotonically decrease based on the difference between this other number of users from the expected number of users (the number of users for which the prior probability is greatest). For example, the prior probability of users may have a normal distribution centred around the expected number of users with a standard deviation calculated based on historical variations in the number of users of the shared resource. The prior probability may have a multi-peaked distribution. For example, the users allocated to the resource may be from two teams, and the distribution of the prior probability may have peaks at the number of users from the first team, the number of users from the second team and the total number of users from both teams, as the users from each of the teams may tend to be present or absent as a unit.

The one or more computing devices may be further configured to determine whether the number of users of the shared resource exceeds a threshold. In response to determining that the number of users exceeds the threshold, the one or more computing devices may be further configured to provide an indication that the threshold has been exceeded.

Determining whether the number of users of the shared resource exceeds a threshold and providing an indication that the threshold has been exceeded facilitates quick remediation of the exceeding of the threshold. Facilitating such quick remediation may ameliorate potential safety risks in the usage of the shared resource and/or reduce the likelihood that the shared resource will breakdown or malfunction due to overuse.

The one or more computing devices may be further configured to determine whether the number of users of the shared resource is at a threshold. In response to determining that the number of users is at the threshold, the one or more computing devices may be further configured to provide an indication that the number of users is at the threshold.

Determining whether the number of users is at the threshold and providing an indication that the number of users is at the threshold facilitates preventing the threshold being exceeded. Preventing the threshold being exceeded may reduce or prevent potential safety risks in the usage of the shared resource and/or reduce the likelihood that the shared resource will breakdown or malfunction due to overuse.

Determining whether the number of users of the shared resource is at the threshold and providing an indication that the threshold has been reached facilitates prevention of the exceeding of the threshold. Facilitating such prevention may ameliorate potential safety risks in the usage of the shared resource and/or reduce the likelihood that the shared resource will breakdown or malfunction due to overuse.

The one or more computing devices may be further configured to, for at least one of the one or more client devices receive an indicator confirming the usage of the one or more resources by a user of the client device. The determination of the location of the client device is further based on the indicator. The indicator may be received from a second client device of the user.

Receiving an indicator confirming the usage of the one or more resources by the user of the client device and using said indicator for the determination of the location may improve the accuracy of the determination that the user is at the usage location of the one or more resources.

The one or more computing devices may be further configured to calibrate the estimation of locations of client devices based on the determined respective locations for the one or more client devices.

By calibrating the estimation of locations of client devices based on the determined respective locations for the one or more client devices, the estimation of the locations of client devices based on wireless signals may be improved. Such calibrations may account for obstacles and electromagnetic interference which are not accounted for in the estimation prior to calibration. Thus, locations estimated subsequent to the calibration are more precise and accurate.

Calibrating the estimations of locations may comprise determining one or more differences between the determined locations and the estimated locations of the one or more client devices; and updating one or more parameters utilised when determining the estimated locations based on the one or more differences to calibrate the estimation of locations.

Estimating the location of the client device may comprise: measuring first values of one or more electromagnetic radiation parameters of the one or more wireless signals received from the client device by at least one of the plurality of detectors. Estimating the location of the client device may be based on the first values. Estimating the location of at least one of the one or more client devices may comprise: measuring second values of one or more parameters of electromagnetic radiation received from the client device by a second at least one of the plurality of detectors. Estimating the location of the client device may be further based on the second values. Estimating the location of at least one of the one or more client devices may comprise:

measuring third values of one or more parameters of electromagnetic radiation received from the client device by a third at least one of the plurality of detectors. Estimating the location of the client device may be further based on the third values.

Using values of electromagnetic radiation parameters of wireless signals received by at least one detector for estimating the location may improve the accuracy and precision of the estimated location. Additionally utilizing electromagnetic parameter values of signals received by a different, second at least one of the plurality of detectors may further improve the accuracy and precision of the estimated location. Additionally utilizing electromagnetic parameter values of signals received by a different, third at least one of the plurality of detectors may further improve the accuracy and precision of the estimated location, e.g. using triangulation.

According to a second aspect, there is provided a computer-implemented method for determining a location of one or more client devices comprising: determining a respective location of each of the one or more client devices at a given time, comprising, for each of the one or more client devices: estimating a location of the client device at the given time, comprising: receiving an indication that one or more detectors of a plurality of detectors received one or more wireless signals from the client device at the given time, wherein each of the plurality of detectors is mapped to a respective location; and estimating the location of the client device at the given time based on the respective locations of each of the one or more detectors; obtaining an indication of a predefined scheduled allocation of one or more resources at the given time or within a predetermined range of the given time, wherein the scheduled allocation indicates a usage location of the one or more resources; determining whether the estimated location of the client device is proximate to the usage location of the one or more resources; and in response to determining that the estimated location of the client device is proximate to the usage location, determining the location of the client device at the given time based on the usage location.

The scheduled allocation of the one or more resources may be to a user of the client device.

The method may include calibrating the estimation of locations of client devices based on the determined locations of the one or more client devices.

Calibrating the estimation of locations of client devices may include determining one or more differences between the determined locations and the estimated locations of the one or more client devices; and updating one or more parameters utilised when determining the estimated locations based on the one or more differences to calibrate the estimation of locations.

The method may further include receiving an indication that a further one or more detectors of the plurality of detectors received a second one or more wireless signals from a second client device other than the one or more client devices; and determining the location of the second client device based on the respective locations of each of the one or more detectors.

Subsequent to calibration, the precision and/or accuracy of estimating the location of client devices based on wireless signals received by detectors is improved. Thus, once a desired level of accuracy and/or precision is reached by calibration, the location of client devices may be determined based on wireless signals received by detectors without indications of scheduled allocations of resources being used to perform the determination.

The one or more resources may comprise a shared resource. The method may further include calculating a number of users of the shared resource based on the determined locations of the one or more client devices. This can also allow users to determine when a shared resource has spare capacity.

The calculation of the number of users of the shared resource may be based on the background probability that the estimated locations of the one or more client devices are proximate to the usage location of the shared resource at or within the predetermined interval the given time.

According to a third aspect, there is provided one or more non-transitory computer-readable media comprising instructions that, when executed by one or more processors, cause the processor to: estimate a location of the client device at the given time, comprising: receiving an indication that one or more detectors received one or more wireless signals from the client device at the given time, wherein the one or more detectors are mapped to a respective location; and estimating the location of the client device at the given time based on the respective location of each of the one or more detectors; obtain an indication of a predefined scheduled allocation of one or more resources at the given time or within a predetermined range of the given time, wherein the scheduled allocation indicates a usage location of the one or more resources; determine whether the estimated location of the client device is proximate to the usage location of the one or more resources; and in response to determining that the estimated location of the client device is proximate to the usage location, determine the location of the client device at the given time based on the usage location.

According to a fourth aspect, there is provided a computer-implemented method comprising: determining a respective location of each of one or more client devices at a given time, comprising, for each of the one or more client devices: estimating a location of the client device at the given time, comprising: receiving an indication that one or more detectors of a plurality of detectors received one or more wireless signals from the client device at the given time; and estimating the location of the client device based on respective locations of each of the one or more detectors; obtaining an indication of a scheduled allocation of one or more resources at or within a predetermined range of the given time; determining that the estimated location of the client device is proximate to a usage location of the one or more resources; and determining the location of the client device at the given time based on the usage location.

According to a fifth aspect, there is provided a computer-implemented method for calculating a number of users of a shared resource, comprising: for each of a plurality of client devices, estimating or determining a respective location of the client device at a given time; and calculating a number of users of the shared resource at the given time based on the determined or estimated locations of the plurality of client devices at the given time and a scheduled allocation of the shared resource to a first one or more users at the given time or within a predetermined range of the given time.

Calculating the number of users of a shared resource facilitates prevention and/or remediation of exceeding the capacity of the shared resource. By monitoring the number of users of a shared resource, users can know not to, or be prevented from, exceeding the capacity of the shared resource. The capacity of the shared resource may be based on safety requirements, e.g. social distancing and/or fire safety protocols where the resource is a room or workspace. Thus, by not exceeding the capacity of the shared resource, such safety requirements may be ensured and the safety of users enhanced. The capacity of the shared resource may also be a machine or other device whose likelihood of malfunction or breakdown is increased when used by more than a maximum number of users at the same time, e.g. manufacturing equipment or a multi-user computing device. Such calculation of the number of users can also allow users to determine when a shared resource has spare capacity.

The scheduled allocation may be a predefined scheduled allocation. For example, the predefined scheduled allocation may be a resource booking and/or a calendar event.

Calculating the number of the users of the shared resource may comprise determining whether a first one or more client devices of the plurality of client devices are proximate to a usage location of the shared resource, wherein the first one or more client devices are client devices of a second one or more users of the first one or more users; and in response to determining that the first one or more client devices are proximate to the usage location of the shared resource, determining that the second one or more users are using the shared resource.

Calculating the number of users of the shared resource may comprise determining whether a second one or more client devices of the plurality of client devices are proximate to a usage location of the shared resource, wherein the second one or more client devices are client devices of a third one or more users, wherein the third one or more users comprise one or more users other than the first one or more users and/or one or more unidentifiable users; and in response to determining that the second one or more client devices are proximate to the usage location of the shared resource, determining that the third one or more users are using the shared resource.

Calculating the number of the shared resources may comprise calculating an expected value for the number of users based on a probability of a first one or more users using the shared resource at the given time and a probability of a second one or more users using the shared resource at the given time. The first one or more users may be the second one or more users that are using the shared resource with a first probability.

The second one or more users may be the third one or more users that are using the shared resource with a second probability. Calculating the expected value may comprise multiplying the number of the first one or more users by the first probability and multiplying the number of the second one or more users by the second probability. The first probability may be greater than the second probability, as the first one or more users may be users which are allocated to the resource while the second one or more users may be users that are unidentifiable and/or not allocated to the resource.

The calculation of the number of users of the shared resource may be based on a prior probability distribution for the number of users of the shared resource.

The calculation of the number of users of the shared resource may be based on a prior probability that the estimated locations of the one or more client devices are proximate to the usage location of the shared resource at or within the predetermined interval of the given time.

The above described features for calculating the number of users may improve the accuracy and/or precision of the calculated number facilitating improved prevention and/or remediation of exceeding the capacity of the shared resource.

The method may further comprise: determining whether the number of users of the shared resource exceeds or is at a threshold; and in response to determining that the number of users exceeds or is at the threshold, providing an indication that the number of users exceeds or is at the threshold.

The estimated or determined locations of the plurality of client devices may be stored in volatile memory.

By storing the estimated or determined locations of the plurality of client devices in volatile memory rather than persistent storage, e.g. not storing the estimated or determined locations of the plurality of client devices in persistent storage, user privacy may be enhanced. Data stored in volatile memory is deleted and/or overwritten promptly after the closure of a process and may be inaccessible to other processes. Furthermore, data stored in volatile memory disappears when power to the volatile memory is turned off. Hence, the likelihood of a malicious third party gaining access to the estimated or determined locations in the case of a security breach is greatly reduced.

BRIEF DESCRIPTION OF THE DRAWINGS

Arrangements of the present invention will be understood and appreciated more fully from the following detailed description, made by way of example only and taken in conjunction with drawings in which:

FIG. 5 shows a method for calculating a number of users of a shared resource in accordance with an embodiment;

DETAILED DESCRIPTION

The embodiments described herein aim to improve the determination of locations of client devices by utilizing scheduled allocations of resources. These improvements result in an improvement in the accuracy and/or precision of the determined locations of the client devices. These improvements in the accuracy and/or precision of the determined locations provided by these embodiments may facilitate improved estimation of the locations of client devices using wireless signals as the estimation of locations may be calibrated using these more accurate and/or precise determined locations.

Location Determination System

Figure 1:
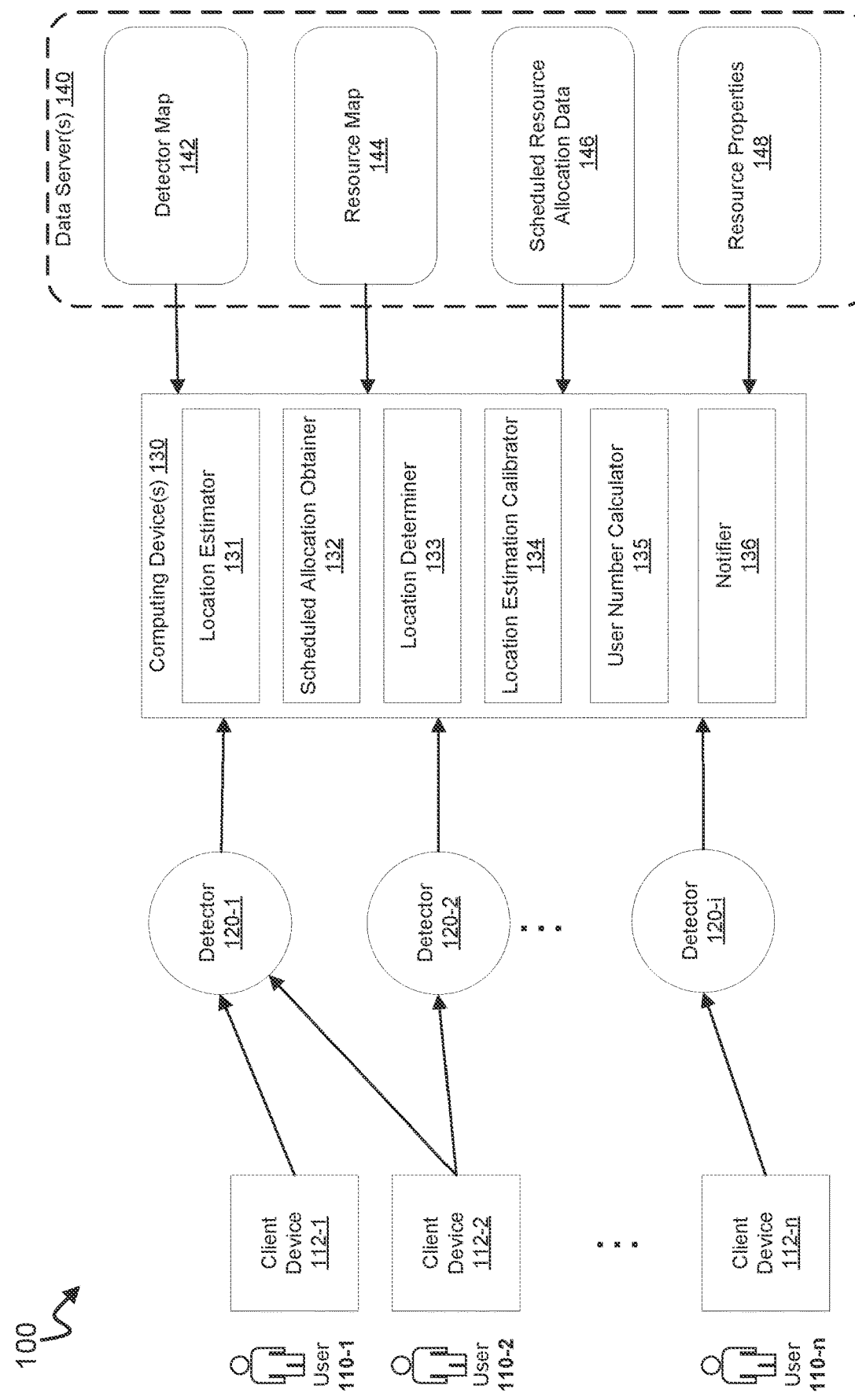
FIG. 1 shows a schematic detailing a computer system for determining locations of client devices in accordance with an embodiment.

FIG. 1 shows a schematic detailing a computer system for determining locations of client devices in accordance with an embodiment.

The computer system 100 includes client devices 112-1 to 112-$n$ (referred to collectively as client devices 112) used by respective users 110. The client devices 112 may comprise one or more portable client devices, e.g. smartphones, tablet computers, laptop computers, and/or feature phones. The client devices 112 may comprise one or more wearable client devices, e.g. one or more smart watches, one or more fitness trackers, one or more items of smart clothing; and/or one or more smart accessories. Further examples of client devices include desktop computers; small-form-factor computers; and game consoles.

Each of the client devices 112 is configured to emit one or more wireless signals. The one or more wireless signals may comprise: one or more wireless signals in accordance with a wireless local area networking protocol, e.g. Wi-Fi, an IEEE 802.11 standard, or a proprietary wireless local area networking protocol; one or more wireless signals in accordance with a wireless personal area networking protocol, e.g. Bluetooth, Bluetooth Low Energy, Zigbee, or an IEEE 802.15 standard; and/or one or more wireless signals in accordance with a cellular networking protocol, e.g. GSM, 3G, LTE, 4G, and/or 5G. The one or more wireless signals can be received by one or more of a plurality of detectors 120-1 to 120-*i* (referred to collectively as detectors 120).

The computer system includes detectors 120. Each of the detectors 120 is configured to receive one or more wireless signals from each of the one or more wireless devices. The detectors 120 may include: one or more wireless local area network access points, e.g. one or more Wi-Fi routers; one or more fixed wireless local area network devices, e.g. a Wi-Fi enabled printer or a Wi-Fi connected desktop; one or more fixed wireless personal area network devices, e.g. a Bluetooth enabled printer or a desktop computer having a Bluetooth receiver; and/or one or more cellular network access points, e.g. a GSM, 3G, LTE, 4G, and/or 5G access point. One or more of the detectors may measure values of one or more electromagnetic radiation parameters of the one or more wireless signals. Examples of the one or more electromagnetic radiation parameters may include received signal strength (RSS), signal time-of-flight, and/or phase difference.

The detectors 120 are configured to provide properties of the one or more wireless signals or data based thereon to one or more computing devices 130. The provided properties may include the values of one or more electromagnetic radiation parameters of the one or more wireless signals, and/or values or data derived therefrom. For instance, where the detectors 120 are wireless access points, each detector may maintain a list of local devices (e.g. a list of device identifiers) as determined by wireless signals detected from those local devices. This list may also include the signal strength of the signals from each of these local devices.

The computer system 100 includes one or more computing devices 130. The one or more computing devices 130 may provide functionality components. The functionality components may include one or more of a location estimator 131, a scheduled allocation obtainer 132, a location determiner 133, a location estimation calibrator 134, a user number calculator 135, and a notifier 136. The functionality components 131-136 may be implemented as one or more computer programs, one or more software libraries and/or one or more computer-executable instructions. The functionality components 131-136 are distinguished from one another for the purposes of explanation. However, any number or all of the functionality components 131-136 may be implemented as a single computer program and/or one or more of the functionality components 131-136 may be implemented as a plurality of interoperating computer programs.

The one or more computing devices 130 may be a single computing device and the components 131-136 may be provided on said single computing device. The one or more computing devices 130 may be a plurality of computing devices and the components 131-136 may be provided across the plurality of computing devices. Providing the components 131-136 across the plurality of computing devices may include providing different ones of the components 131-136 using different computing devices and/or may include distributing individual components across multiple computing devices. The one or more computing devices 130 may be one or more computing devices of a cloud computing service.

The location estimator 131 is configured to estimate the location of a client device 112. The location estimator 131 may be configured to determine whether one or more of the detectors 120 received one or more wireless signals from the client device. This determination may be based on receiving from the detectors an indication that such one or more wireless signals have been received. The indication may include the one or more properties of the wireless signals and/or data based thereon provided by the detectors to the one or more computing devices.

In response to determining the one or more such wireless signals were received, the location of the client device is estimated based on the locations of the one or more detectors 120. The locations of the one or more detectors may be obtained from the detector map 142. Such an estimation can be made based on the properties of the wireless signals, e.g. values of electromagnetic radiation parameters of the wireless signals. An Indoor Positioning System (IPS) is an example of a system using which locations of client devices may be estimated based on wireless signals received by detectors. Examples of Indoor Positioning Systems include Wi-Fi Positioning Systems (WPS) and Ultra-Wideband (UWB) Positioning Systems. Examples of how the estimating of the location of client device may be performed are described in relation to step 410 of FIG. 4.

The scheduled allocation obtainer 132 is configured to obtain an indication of a scheduled allocation of one or more resource at a given time or within a predetermined range of a given time. The scheduled allocation may be a predefined scheduled allocation.

The indication may include an indication of the one or more resources allocated. The indication may further include a start time of the scheduled allocation and/or an end time of the scheduled allocation, e.g. the indication of the scheduled allocation of the one or more resources may be a booking, such as a calendar appointment or booking system entry, indicating the time period for which the one or more resources are allocated. The given time may be within a time interval between the start time and the end time. The given time may be within a predetermined range of the start time and/or the end time of the allocation. For example, the given time may be within an arrival interval of the start time. The arrival time interval may indicate a period of time within which a user, and their client device, may be expected to arrive at the usage location of the one or more resources before the scheduled allocation. For example, a user may be expected to arrive at the usage location up to a predetermined amount of time before their allocation, e.g. to prepare to use the resource or to ensure that they are present before their scheduled allocation. For example, a user may arrive at their desk up to an hour before the start of their scheduled allocation at that desk or a user may arrive in a meeting room up to fifteen minutes before the scheduled allocation of that meeting room to them. The arrival time interval may be any suitable time interval, e.g. the arrival time interval may be five minutes, ten minutes, half an hour or an hour. As another example, the given time may be within a departure time interval of the end time. The departure time interval may indicate a period of time within which a user, and their client device, may be expected to depart the usage location of the one or more resources after the scheduled allocation. For example, a user may be expected to departed to depart the usage location up to a predetermined amount of time after their allocation, e.g. because their usage of the resource overran their scheduled allocation. For example, a user may be at their desk up to an hour after the end of their scheduled allocation at that desk or a user may depart a meeting room up to fifteen minutes after the scheduled allocation of that meeting room to them. The departure time interval may be any suitable time interval, e.g. the departure time interval may be five minutes, ten minutes, fifteen minutes, twenty minutes, half an hour, an hour or two hours.

The indication of the scheduled allocation of the one or more resources may include an indication of the user(s) to which the one or more resources are allocated. For example, the indication of the scheduled allocation may include identifiers of the one or more users to which the resource is allocated. For example, the indication of the scheduled allocation of the one or more resources may include an indication that a desk or other workspace is allocated to or booked for a particular user for a given time interval. The scheduled allocation of the one or more resources may be to a plurality of users. For example, the indication of the scheduled allocation of the one or more resources may include an indication that a meeting room is allocated to or booked for a particular group of users for a given time interval.

The indication may be obtained from the scheduled resource allocation data 146. The indication may be obtained using any suitable mechanism. For example, the indication may be obtained from the scheduled resource allocation data 146 using: a service request, e.g. a ReST or SOAP service request; a database query; an interprocess communication mechanism (IPC); shared memory between a provider of the scheduled resource allocation data 146 and the scheduled allocation obtainer 132; and/or retrieved from persistent storage accessible by the scheduled allocation obtainer 132.

Examples of the allocated one or more resources may include, for example: event locations, e.g. confluence locations, such as meeting room, and/or conference locations, such as a convention center or assembly hall; specialized equipment, such as a 3D printer, motion capture device, industrial machine, or medical device; fixed-location computing devices, e.g. desktop computers; equipment, e.g. printers, telecommunication equipment or video conferencing equipment; workspaces such as desks, tables, office spaces, or laboratory spaces; and/or gymnasium space and equipment.

The location determiner 133 is configured to determine whether a usage location of one or more resources is proximate to an estimated location of a client device, and, if so, determining the location of the client device 112 based on the usage location. The estimated location may be proximate to the usage location if it is within a threshold range of the usage location. The estimated location may be obtained from the location estimator 131. The usage location of the one or more resources may be included in the obtained indication of the scheduled allocation of the one or more resources. Alternatively or additionally, the usage location of the one or more resources may be obtained from a resource map 144. Methods for determining whether the usage location is proximate to the estimated location are described in relation to step 440 of FIG. 4. Methods for determining the location of the client device 112 based on the usage location are described in relation to step 450 of FIG. 4.

The usage location of these one or more resources is the expected location at which they are to be used by one or more users (e.g. as indicated by the schedule). The usage location may be the location of the one or more resources. For example, the usage location of a room or workspace is the location of the room or workspace itself. However, for some types of resources, the usage location of the one or more resources may be different from the location of the resource itself. For example, a remote server may be utilized by computer terminals at a particular usage location. As another example, medical equipment or industrial machines may be operated remotely by a user from a terminal. For example, an X-ray or radiotherapy machine may be operated by a medical professional from a shielded location. Details of how usage locations may be represented are described in relation to the resource map 144.

The schedule may indicate a particular resource and the usage location for this particular resource may be obtained by looking up the usage location of the resource in the resource map 144. Where the usage location is obtained from the resource map 144, the usage location may be obtained using any suitable mechanism. For example, the indication may be obtained from the resource map 144 using: a service request, e.g. a ReST or SOAP service request; a database query; an interprocess communication mechanism (IPC); shared memory between a provider of resource map 144 and the location determiner 133; and/or retrieved from persistent storage accessible by the scheduled allocation obtainer 132.

The location estimation calibrator 134 is configured to calibrate the estimation of locations based on the determined location of the client device. The location estimation calibrator 134 may be configured to calibrate the estimation of locations based on the difference between the estimated location of the client device and its determined location. The location estimation calibrator 134 may be configured to calibrate the estimation of locations based on the determined locations of a plurality of client devices. The location estimation calibrator 134 may be configured to determine based on differences between a plurality of determined locations and a respective plurality of estimated locations for a plurality of client devices. Methods by which the estimation of locations may be calibrated are described in relation to step 620 of FIG. 6.

The user number calculator 135 is configured to calculate the number of users using a shared resource. Methods by which the number of users may be calculated are described in relation to step 520 of FIG. 5.

The notifier 136 is configured to provide indications (e.g. alerts) that the number of users using a shared resource is at or exceeds a threshold. The indications may be provided to one of the client devices 112, and/or may be provided to a client device of another user, e.g. a manager of the shared resource such as a facilities manager. The indication may be provided as a message and/or notification to the client device, e.g. an SMS or other messaging service message may be sent to the client device and/or a push notification may be sent to the client device and displayed on the client device by an app and/or notification facility of the client device. Alternatively or additionally, the indication may be provided by activating notification hardware associated with the one or more resources, e.g. a light, speaker and/or display associated with the resource. For example, an audio and/or visual alarm may sound when the threshold has been exceeded.

The system 100 includes data server(s) 140. The data server(s) 140 store data that is used by the functionality components 131-136 of the computing device(s) 130. The stored data includes a detector map 142, a resource map 144, scheduled resource allocation data 146, and/or resource properties 148. The functionality components 131-136 may obtain data from the data server(s) 140. The data may be obtained by the functionality components 131-136 by retrieving data from the data server(s) 140 and/or by receiving data from the data server(s) 140. The data server(s) 140 may be a single computing device. The data server(s) 140 may be a plurality of computing devices and the stored data 142-148 may be provided across the plurality of computing devices. Providing the stored data across the plurality of computing devices may include providing different ones of the stored data 142-148 using different computing devices and/or may include distributing parts of one of the stored data 142-148 across multiple computing devices. The data server(s) may be one or more computing devices of a cloud computing service. The data server(s) 140 may store the data using any suitable application and/or in any suitable format. For example, the data server(s) may store the data using any of or any combination of a database; flat-file storage; and/or an application-specific data store, e.g. a calendar and/or resource management application data store.

The detector map 142 maps each of the detectors 120 to a respective location. The respective location to which each detector is mapped may be the location of the detector, e.g. the physical location of the detector. The respective locations of each of the detectors may be represented by one or more coordinates. The one or more coordinates may represent the location of the detector 120 within a building with the one or more coordinates indicating the position of the detector relative to a floor plan of the building. The coordinates may represent the location of the detector as an offset from a particular point on the floor plan. For example, the coordinates may represent the location of a detector on a floor using offsets from a corner of the floor plan. The co-ordinates may be two-dimensional and indicate the location of the detector along the same dimensions as the floor. The co-ordinates may be three-dimensional and may additionally indicate the location of the detector in the dimension substantially perpendicular to the floor, e.g. a height of the detector. This indication may indicate the height of the detector approximately such as by indicating which floor the detector is on in a multistory building or may more precisely indicate the height of the detector, e.g. using suitable measurements from floor level, ground level, or sea level. The one or more coordinates may represent the geographic location of the detector 120. The geographic location of the detector may be represented using longitude and latitude co-ordinates. The one or more co-ordinates may further include an altitude co-ordinate indicating the altitude of the detector.

The resource map 144 maps each of a plurality of resources to a respective usage location. The respective usage location of a resource may be the location of the resource or may be another location from which the resource is used. The respective usage locations of each of the resources may be represented by one or more coordinates. The one or more coordinates may represent the location of the resource within a building with the one or more coordinates indicating the position of the resource relative to a floor plan of the building. The coordinates may represent the location of the resource as an offset from a particular point on the floor plan. For example, the coordinates may represent the location of a resource on a floor using offsets from a corner of the floor plan. The co-ordinates may be two-dimensional and indicate the location of the resource along the same dimensions as the floor. The co-ordinates may be three-dimensional and may additionally indicate the location of the resource in the dimension substantially perpendicular to the floor, e.g. a height of the resource. This indication may indicate the height of the resource approximately such as by indicating which floor the resource is on in a multistory building or may more precisely indicate the height of the resource, e.g. using suitable measurements from floor level, ground level, or sea level. The one or more coordinates may represent the geographic location of the resource 120. The geographic location of the resource may be represented using longitude and latitude co-ordinates. The one or more co-ordinates may further include an altitude co-ordinate indicating the altitude of the resource.

The scheduled resource allocation data 146 includes one or more scheduled allocation data elements for each of one or more resources. Each of the one or more scheduled allocation data elements may include an indication of a time interval at which the resource is allocated. For example, the scheduled allocation data elements may include a start time and an end time for the allocation of the resource. As an example, the scheduled allocation data elements may include calendar or resource management system entries indicating when a resource is booked, e.g. when a desk or meeting room is booked. The scheduled allocation data elements may further include an indication of one or more users to which a resource is allocated at the time interval.

The identity of a user to which the resource is allocated may be indicated in any suitable way. For example, the identity of the a user may be indicated by a name of the user, an ID of the user, a username of the user, a user account identifier of the user, a digital token associated with the user, a MAC address of a client device of a user, or an IP address of a client device of the user.

A mapping may associate identities of users with identifiers of their client devices. Such a mapping may be used in determining whether the user of a client device is the user or one of the users to which the resource is allocation. The mapping may include, for each of one or more users, an association between a user identifier and one or more client device identifiers, wherein the one or more client device identifiers are for client devices associated with the user. Examples of user identifiers include a name, a username, a user ID, and a digital token associated with the user. Examples of client device identifiers include a MAC address, an IP address, a device ID, a digital token associated with the device and a serial number of the device. The mapping may form a part of the scheduled resource allocation data 146 or may be stored separately from the scheduled resource allocation data 146.

The resource properties data 148 includes properties for one or more of the plurality of resources. Examples of the properties of a resource include: the name of a resource; the size of the resource, e.g. the dimensions of the resource; the size of a usage location of the resource, e.g. the dimensions of the usage location of the resource; and a capacity of the resource, e.g. the maximum number of people that can use a resource at one time. The size of a resource, or the usage location of the resource where this is different, may be used for indicating the precision of a location determined based on the usage location of the one or more resources. The size of the resource or the usage location thereof may also be used in determining whether the estimated location of a client device is proximate to this location. The threshold of the notifier 136 may be the capacity of the resource or may be based on the capacity of the resource.

First Schematic Map

Figure 2:
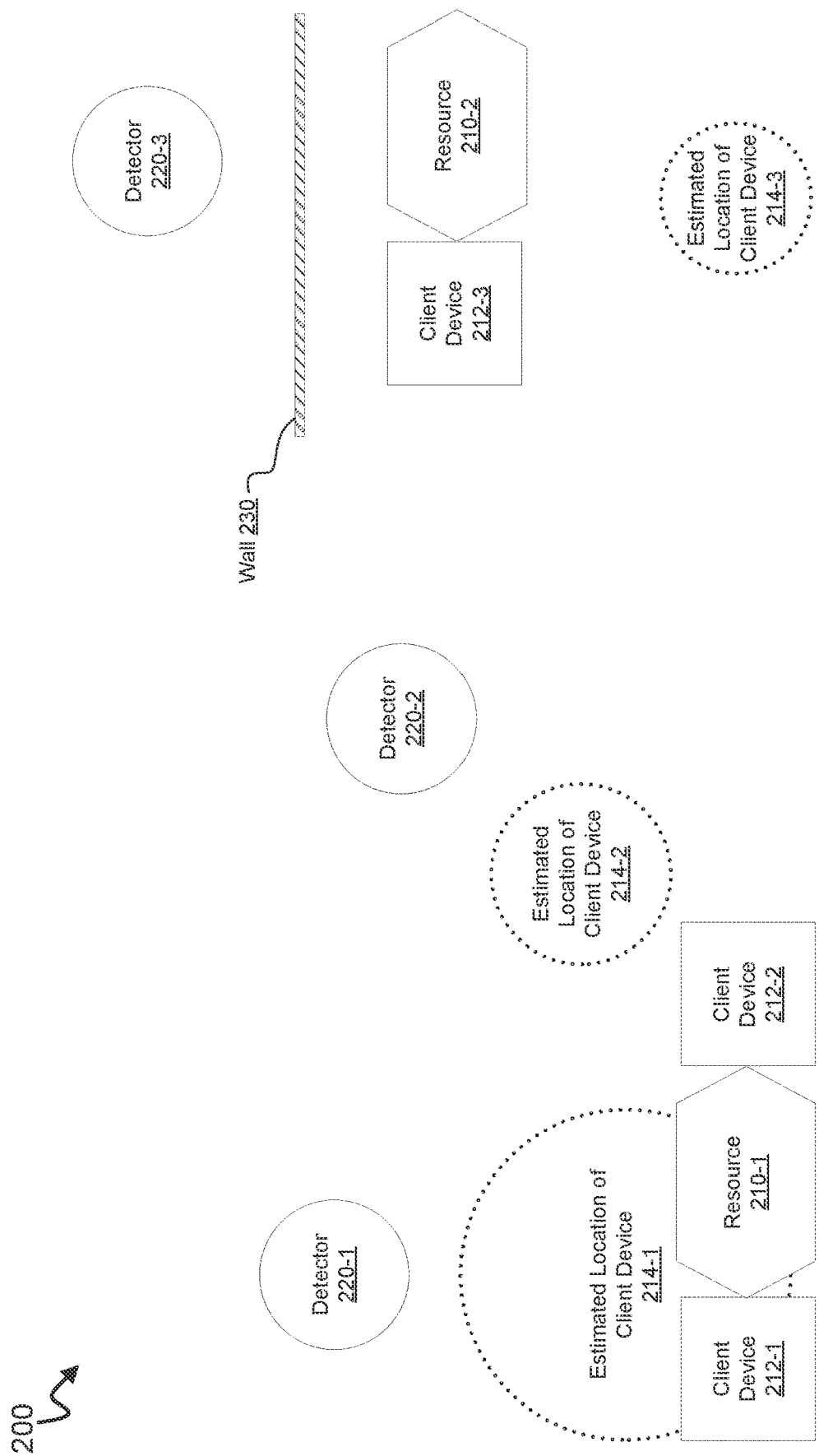
FIG. 2 shows a schematic map illustrating a first scenario in which a computer system in accordance with an embodiment may be utilized.

FIG. 2 shows a schematic map 200 illustrating a first scenario in which a computer system in accordance with an embodiment may be utilized.

The schematic map 200 includes resources 210-1 and 210-2 (collectively referred to herein as resources 210), client devices 212-1, 212-2 and 212-3 (collectively referred to herein as client devices 212), the estimated locations thereof 214-1, 214-2 and 214-3 (collectively referred to herein as estimated locations 214), detectors 220-1, 220-2 and 220-3 (collectively referred to herein as detectors 220), and a wall 230.

Each of the resources 210 may be a resource of any of the types previously described. For example, each resource may be any of a workspace, a desk, a computing device, manufacturing equipment, video conferencing equipment, or a room.

Each of the client devices 212 may be of any of the types of client devices previously described (e.g. mobile client devices). The positions of the client devices 212 on the map indicate their actual locations. Each of the client devices 212 emits one or more wireless signals that can be received by one or more of the detectors 220.

Each of the detectors 220 may be of any of the types of detectors previously described (e.g. wireless access points). Each of the detectors 220 receives one or more wireless signals from at least one of the client devices 212.

An estimated location 214 is associated with each of the client devices 212. The estimated location indicates the location of the client device as estimated using one or more of the detectors 220. The area of the circles representing the estimated location 214 indicates the area within which the corresponding client device 212 is estimated to be. A larger circle indicates that the location is estimated with less precision, e.g. due to noisier data and/or less data being available for the estimation, such as: fewer wireless signals and/or wireless signals received by one detector rather than multiple; and/or calibration information. A smaller circle indicates that the location is estimated with more precision, e.g. due to more accurate data and/or more data being available for the estimation, such as: more wireless signals and/or wireless signals received from a plurality of detectors 220, and/or calibration information. An estimated location 214 may be precise but inaccurate, e.g. give a precise estimate of a wrong location. Such inaccuracies in estimated locations 214 may occur for a variety of reasons, e.g. miscalibration, unexpected obstacles, and/or electromagnetic interference. Even where there are a relatively large number of wireless signals from a device, the estimate may still be imprecise (e.g. where noise in the wireless signals means that an accurate position cannot be obtained).

The precision and/or accuracy of an estimated location may also be reduced due to a time difference between when the one or more wireless signals were received and the given time. For example, one or more wireless signals may be received from a client device infrequently, e.g. at fixed or varying time intervals each of a length long enough for a user to move the client device a significant distance. An example of such a length of time interval is a second as the average human walking speed is approximately 1.4 m/s so a time interval of a second or more would give a human sufficient time to move the device 1.4 m at an average walking speed, which is a sufficiently long time to affect the accuracy and/or precision of the estimation. In some cases, the time interval can be considerably longer than a second, e.g. up to 30 minutes. The reduction in the precision and/or accuracy may be proportional to the length of time between the given time and the time at which the one or more wireless signals were received.

The wall 230 impedes wireless signals that pass through it. For example, portions of wireless signals that traverse the wall 230 are reflected or absorbed by it, such that the intensity of the wireless signals reaching the other side of the wall are reduced.

The detector 220-1 receives wireless signals from the client device 212-1. However, the estimated location 214-1 of the client device 212 is imprecise, e.g. due to a limited number of wireless signals being received. The estimated location 214-2 of the client device 212-2 may alternatively or additionally be imprecise because one or more wireless signals may not have been received for a length of time which is sufficiently long enough to affect the accuracy of the estimated location 214-1. There is a scheduled allocation of the resource 210-1 to the user of the client device 212-1 at the given time. Thus, it can be determined that the client device 212-1 is at the usage location of the resource 210-1. The location of the client device 212-1 may be precisely determined based on both the estimated location 214-1 and the usage location of the resource 210-1. The usage location of the client device may include the location of the client device 212-2. However, the location of the client device 212-1 can be accurately and precisely determined as its actual position based on an intersection of the estimated location 214-1 and the usage location of the resource 210-1.

The detectors 220-1 and 220-2 receive wireless signals from the client device 212-2. However, the estimated location 214-2 of the client device 212-2 based on these wireless signals is inaccurate, e.g. due to interference or miscalibration. The estimated location 214-2 of the client device 212-2 may alternatively or additionally be inaccurate because one or more wireless signals may have not been received for a length of time which is sufficiently long enough to affect the accuracy of the estimated location 214-2. There is a scheduled allocation of the resource 210-1 to the user of the client device 212-2 at the given time. Thus, it can be determined that the client device 212-2 is at the usage location of the resource 210-1. The location of the client device 212-1 may be precisely determined based on both the estimated location 214-2 and the usage location of the resource 210-1. The usage location of the resource 210-1 includes the location of the client device 212-1. However, the location of the client device 212-2 can be accurately and precisely determined as its actual position by determining that it is at the closest usage location of the resource 210-1 to its estimated location.

The detector 220-3 receives wireless signals from the client device 212-3. The estimated location 214-3 of the client device 214-3 is based on these wireless signals and may be based on the received signal strength, e.g. the strength of the signal received by the detector 220-3 from the client device 212-3. As the wall 230 impedes the wireless signals, the received signal strength of the wireless signals is less than would be expected for a client device at the distance of client device 212-3. Hence, the estimated location 214-3 is further from the detector 220-3 than the actual location of the client device 212-3. There is a scheduled allocation of the resource 210-2 to the user of the client device 212-3 at the given time. Hence, the location of the client device 212-3 may be accurately determined as the usage location of the resource 210-2. The difference between the estimated location 214-3 and this determined location may be used to calibrate the estimation of locations of client devices, such that future estimation of locations of client devices accounts for the impeding of wireless signals by the wall 230. This may be achieved by adding a scaling factor to certain signals detected by detector 220-3 or a displacement to estimated locations determined using detector 220-3. This may be applied only in certain situations or to a specific region (e.g. where the estimated location would fall on the other side of the wall to the detector 220-3).

Second Schematic Map

Figure 3:
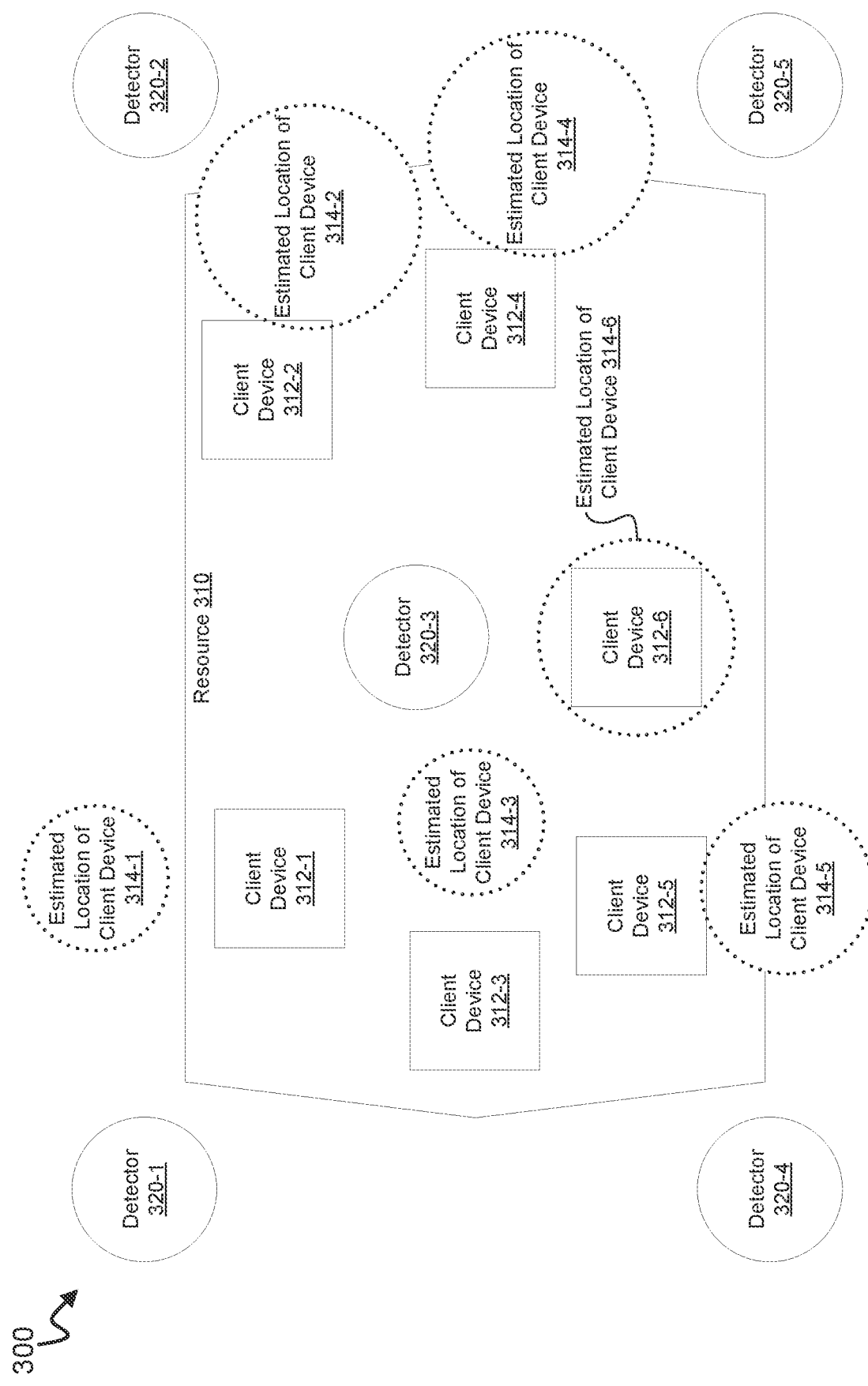
FIG. 3 shows a schematic map illustrating a second scenario in which a computer system in accordance with an embodiment may be utilized.

FIG. 3 shows a schematic map 300 illustrating a second scenario in which a computer system in accordance with an embodiment may be utilized.

The schematic map 300 includes a resource 310, client devices 312-1, 312-2, 312-3, 312-4, 312-5, and 312-6 (referred to collectively as client devices 312), the estimated locations thereof 314-1, 314-2, 314-3, 314-4, 314-5, and 312-6 (referred to collectively as estimated locations 314), and detectors 320-1, 320-2, 320-3, 320-4 and 320-5 (referred to collectively as detectors 320).

The usage location of the resource 310 is the inside of the resource 310, and the inside of the resource 310 accommodates multiple users and client devices 312 thereof. The resource 310 is an example of a shared resource. For instance, the resource 310 may be a room or space, such as a meeting room, conference room, factory floor, etc.

Each of the client devices 312 may be of any of the types of client devices previously described. The positions of the client devices 312 on the map indicate their actual locations. Each of the client devices 312 emits one or more wireless signals that can be received by one or more of the detectors 320.

An estimated location 314 is associated with each of the client devices 312. As described in relation to the schematic map 200, the area of the circle indicates the precision of the estimated location, but a precise location may, in some circumstances, be inaccurate.

Each of the detectors 320 may be of any of the types of detectors previously described. Each of the detectors 320 receives one or more wireless signals from at least one of the client devices 312. The one or more wireless signals are used to estimate the locations of the client devices.

As is illustrated, the estimated locations 314 of the client devices 312 are of varying precision and accuracy. The estimated location 314-1 of the client device 312-1 is incorrectly identified as being outside of the resource 310. The estimated locations 314-3 and 314-6 of client devices 312-3 and 312-6 are correctly identified as being within the resource 310. The estimated locations 314-2, 314-4 and 314-5 do not have sufficient precision to correctly identify whether the client devices 314-2, 314-4 and 314-5 are within the resource. Thus, the number of users of the resource 310 would be calculated inaccurately if solely based on these estimated locations 314. The client device 312-1 would be incorrectly estimated as being outside of the resource, hence the user of the client device would be incorrectly determined as not using the resource, and it would not be possible to accurately determine whether the client device 312-2, 312-4 and 312-5 were within the resource and hence, whether the users thereof were using the resource due to the lack of precision of the estimated locations 314-2, 314-4 and 314-5. There is a scheduled allocation of the resource 310 at the given time. Hence, as the estimated locations 314 of the client devices 312 are proximate to the resource 320, it can be determined that the client devices 312 are at a usage location of the resource 310, e.g. within the resource 310, as the users of the client devices 312 are there for the scheduled allocation. Hence, the number of users of the shared resource 310 can be accurately calculated as six. The scheduled allocation may be to all, or any number of the users of the client device(s) 312. The scheduled allocation need not be allocated specifically to any of the client devices 312. For instance, a general event may be scheduled in a conference room with unrestricted access. In this case, all potential users may be considered to be allocated the resource.

Location Determination Method

Figure 4:
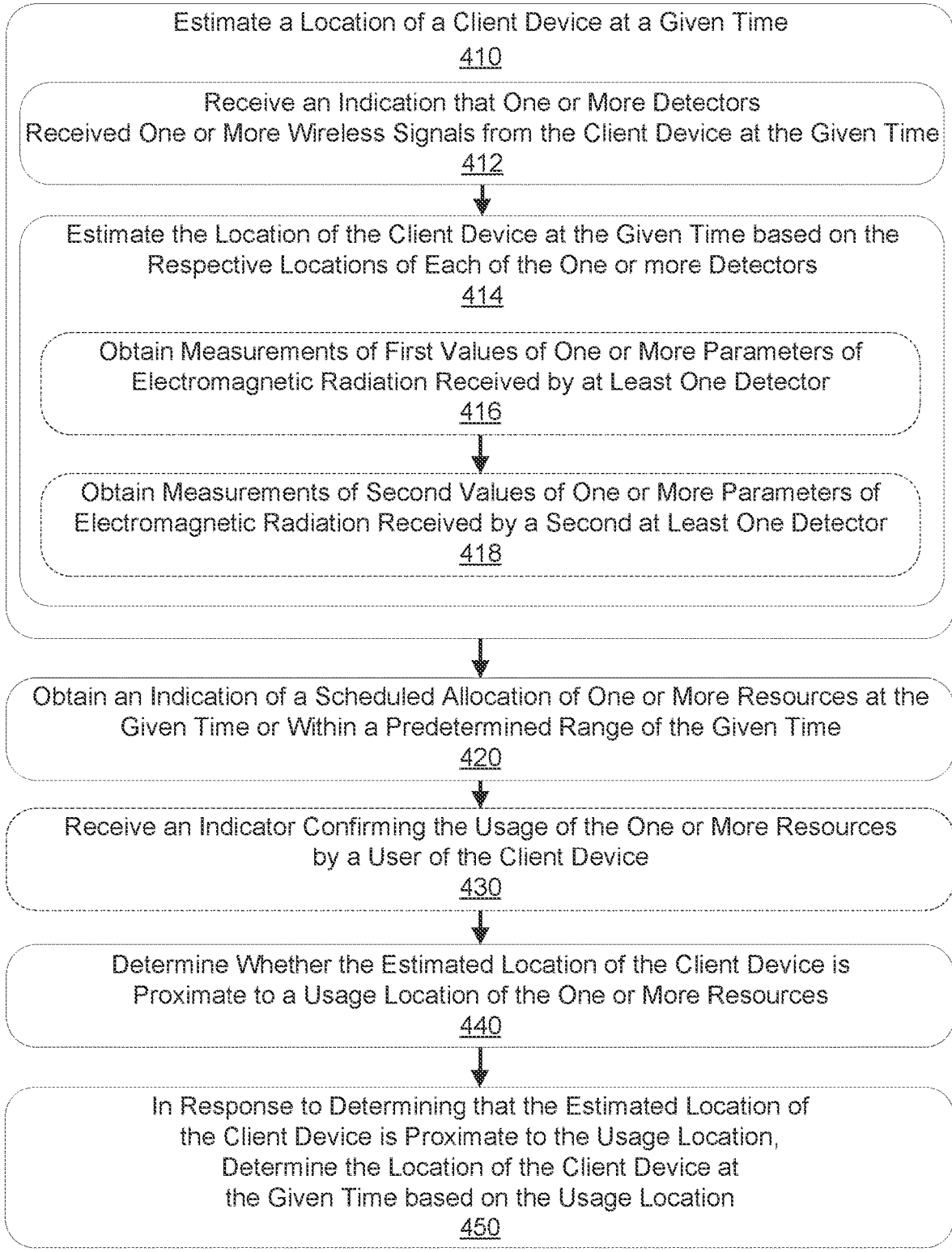
FIG. 4 shows a method for determining a location of a client device in accordance with an embodiment.

FIG. 4 illustrates an example method 400 for determining a location of a client device in accordance with an embodiment. The example method 400 may be implemented as one or more computer-executable instructions executed on one or more computing devices, e.g. one or more instance of the computing device 700 described in relation to FIG. 7. The example method may be performed by the one or more computing devices 130 described with respect to FIG. 1. Optional steps are indicated via dashed lines.

At step 410, a location of a client device at a given time is estimated.

Step 410 includes a step 412 of receiving an indication that one or more detectors received one or more wireless signals from the client device at the given time.

Step 410 includes a step 414 of estimating the location of the client device at the given time based on the respective locations of each of the one or more detectors.

For example, the location of the client device may be estimated as being within a given radius of a detector based on the range from which the detector can receive signals. Where a plurality of detectors received one or more wireless signals from the one or more, the location of the client device may be estimated as being within the intersection of the given radiuses for each of the detectors. The location of the client device may additionally or alternatively be estimated based on the direction of receipt the one or more wireless signals at a detector.

Step 414 may include an optional step 416 of obtaining measurements of first values of one or more parameters of electromagnetic radiation received from the client device by at least one of the one or more detectors. The estimation of the location of the client device may be based on these first values of one or more electromagnetic radiation parameters of the one or more wireless signals. Examples of the one or more parameters may include received signal strength (RSS), signal time-of-flight, and/or phase difference. The values of the one or more parameters of the electromagnetic radiation may be used to determine the distance and/or direction of the client device relative to the detector. For example, a lower RSS, e.g. a weaker strength of the signal received from the client device, may indicate that the client device is further from the detector.

Step 414 may include an optional step 418 of obtaining measurements of second values of one or more parameters of electromagnetic radiation received from the client device by a second at least one of the one or more detectors. The second at least one of the one or more detectors may be different to the (first) at least one of the one or more detectors. The estimation of the location of the client device may be based on these second values of one or more parameters of electromagnetic radiation of the one or more wireless signals. The estimation of the location of the client device may be based on both the first values and the second values. Using values of electromagnetic radiation parameters received from the client device by multiple detectors may enhance the precision and accuracy of the estimation of the location of the client device as the distance and/or direction relative to two different detectors may be determined.

Step 414 may include further optional steps (not shown) of obtaining measurements of further values of one or more parameters of electromagnetic radiation received from the client device by further at least ones of the one or more detectors. The further at least ones of the one or more detectors may be different from the (first) at least one of the one or more detectors, the second at least one of the one or more detectors and may be different from one another. The estimation of the location of the client device may be additionally based on these further values. For example, third values of one or more parameters of electromagnetic radiation received from the client device by a different third at least one detector of the one or more detectors may be obtained, and the estimation of the location of the client device may be based on the first values, the second values and the third values. The estimation of the location of the client device may include triangulation based on the first values, the second values, and the third values and the mapped positions of the respective at least one detectors.

An example of a method that estimates the location of client devices using values of parameters of electromagnetic radiation received by detectors from the client device is the method employed by an Indoor Positioning System (IPS). Examples of Indoor Positioning Systems include Wi-Fi Positioning Systems (WPS) and Ultra-Wideband (UWB) Positioning Systems.

The estimation of the location of client devices may be configurable. For example, the estimation of the location of the client devices may be configurable using one or more parameters. These one or more parameters may mediate the relationship between the properties of the wireless signals, e.g. the values of the parameters of electromagnetic radiation received by the detectors, and the estimated location. Thus, by adjusting these parameters, the estimated location of a client device for given properties of the wireless signals may be changed.

At step 420, an indication of a scheduled allocation of one or more resources at the given time or within a predetermined range of the given time is received. The scheduled allocation may be a predefined scheduled allocation. The predetermined range of the given time may include an arrival interval and/or a departure interval. Details of the scheduled allocation and the indication thereof are described in relation to the scheduled allocation obtainer 132 and scheduled resource allocation data 146 of FIG. 1.

At optional step 430, an indicator confirming the usage of the one or more resources by a user of the client device is received. The indicator may be based on a user interface input by the user to the client device or to another device. For example, the user may activate a button, e.g. by clicking or tapping on the button, to confirm that they are using the resource. This confirmation may be part of a "check-in" process for the resource. The indicator may be based on the scanning of a visual tag associated with the resource, e.g. a QR code located on or proximate to the resource which may be scanned by a user. The indicator may be sent by a device in response to scanning the QR code using the device. The device may be the client device whose location is estimated or may be a different device (e.g. a different client device). For example, the client device whose location is being estimated may be a laptop and the client device, and the user may scan the QR code using their smartphone as its hardware, e.g. the smartphone camera, and its form factor, e.g. its smaller size, facilitates the scanning of the QR code. Other examples of how the usage of the one or more resources by a user of the client device may be confirmed include near-field communication between a client device of the user and an NFC device associated with the resource, and/or the receipt of a signal of a Bluetooth (Low Energy) beacon associated with the resource being received by the client device. Alternatively, where the resource itself is a device (such as a fixed computer terminal) then the indicator may be sent by the resource (e.g. in response to the user logging into this device). An indicator may be derived based on these methods of confirmation, sent by the user via a device, and received.

At step 440, it is determined whether the estimated location of the client device is proximate to a usage location of the one or more resources.

Determining whether the estimated location of the client device is proximate to a usage location of the one or more resources. The estimated location of the client device may be determined to be proximate to the usage location of the one or more resources if the estimated location of the client device is within a threshold distance of the usage location of the one or more resources. The threshold distance may be a fixed distance. The threshold distance may be a variable distance based on one or more aspects relating to the estimated location and/or the usage location of the one or more resources. For example, the threshold distance may be greater where the estimated location is of a lower precision as the relative accuracy of the usage location is likely to be greater. As another example, the threshold distance may be greater where the usage location of the one or more resources is greater as the likelihood of being in a larger usage location is greater than that of being in a smaller usage location.

At step 450, the location of the client device at the given time is determined based on the usage location in response to determining that the estimated location of the client device is proximate to the usage location. The location of the client device may be determined to be the usage location of the one or more resources. The location of the client device may be determined based on both the usage location and the estimated location. For example, the usage location of the one or more resources and the estimated location may intersect and the location of the client device may be determined to be at this intersection. As another example, the one or more resources may have a plurality of usage locations and the location of the client device may be determined as the usage location closest to the estimated location.

User Number Calculation Method

FIG. 5 illustrates an example method 500 for calculating the number of users of a shared resource in accordance with an embodiment. The example method 500 may be implemented as one or more computer-executable instructions executed on one or more computing devices, e.g. one or more instances of the computing device 700 described in relation to FIG. 7. The example method may be performed by the one or more computing devices 130 described with respect to FIG. 1. Optional steps are indicated via dashed lines.

At step 510, for each of a plurality of one or more users, a step 512 of determining or estimating the location of a client device is performed. The step 512 may include either the steps of the method 400 to determine the location of the respective client device or the step 410 is performed to estimate the location of the respective client device. The locations for each of the one or more client devices may be a combination of estimated location and determined locations, e.g. locations for some of the client devices may be determined locations and the locations for others of the client devices may be estimated locations.

At step 520, a number of users of a shared resource is calculated based on the determined or estimated locations of the plurality of client devices. The calculation may be of the number of the users of the shared resource at a given time. The calculation of the number of users of the shared resource may be further based on a scheduled allocation of the shared resource to one or more users at the given time or within a predetermined range of the given time. The scheduled allocation may be a predefined scheduled allocation, e.g. a resource booking and/or a calendar event.

The calculation of the number of users of the shared resource may be based on the prior probability that the estimated locations of the one or more client devices are proximate to the usage location of the shared resource at or within a predetermined range of the given time. The background probability may be or be based on the probability that the estimated locations of the one or more client devices would be present at the usage location if not for the scheduled allocation. This may be based on historical estimated locations and/or historical wireless signals detected by the plurality of detectors for the one or more client devices.

The prior probability may be referred to as the background probability.

Using the prior probability that the estimated locations of the or more client devices are proximate to the usage location of the shared resource at or within the predetermined range of the given time may improve calculation of the number of users by improving the accuracy with which it can be determined that the respective user of the at least one of the one or more client devices is using the shared resource and is present at the usage location. If a user of a client device has a high prior probability of being proximate to the usage location in general and is not a user to which the shared resource has been explicitly allocated then it may be determined that they are not using the resource and are proximate to the usage location of the resource coincidentally. In contrast, if the user has a low probability of being proximate to the usage location in general then it may be determined that they are using the shared resource and are proximate to the usage location for the scheduled allocation.

The prior probability may be based on the number of client devices that are estimated to be proximate to the usage location (e.g. that have estimated locations proximate to the usage location). The prior probability of a larger number of client devices being proximate to the usage location by chance may be lower than that of a smaller number of client devices being proximate to the usage location by chance. Hence, if a larger number of client devices are proximate to the usage location are present then it may be determined that the client devices are there for the scheduled allocation of the shared resource and may be calculated as being users of the shared resource.

The prior probability distribution may be referred to as the background probability distribution.

The calculation of the number of users may be based on a prior probability distribution for the number of users of the shared resource. The prior probability distribution for the number of users may be based on the number of users to which the shared resource is allocated. The prior probability may be greatest for an expected number of users. For instance, a Gaussian or any other peaked distribution may be used, with a maxima at an expected number of users. The expected number of users may be equal to the number of users to which the shared resource is allocated. As another example, the expected number of users may be an amount or a proportion less than the number of users to which the shared resource is allocated as it may be expected that at least some users may not use the resource. For example, it may be expected that two users to which the shared resource is allocated may not use the shared resource, or it may be expected that 10% of the users to which the resource is allocated may not use the shared resource. The prior probability of other number of users may monotonically decrease based on the difference between this other number of users from the expected number of users (the number of users for which the prior probability is greatest). For example, the prior probability of users may have a normal distribution centred around the expected number of users with a standard deviation calculated based on historical variations in the number of users of the shared resource. The prior probability may have a multi-peaked distribution. For example, the users allocated to the resource may be from two teams, and the distribution of the prior probability may have peaks at the number of users from the first team, the number of users from the second team and the total number of users from both teams, as the users from each of the teams may tend to be present or absent as a unit.

The step 520 may include a step 522 of determining whether a first one or more client devices of the plurality of client devices are proximate to a usage location of the shared resource. The first one or more client devices are client devices of a second one or more users of the first one or more users to which the shared resource is allocated.

The step 520 may include a step 524 of determining that the second one or more users are using the shared resource in response to determining that the first one or more client devices are proximate to the usage location of the shared resource. It may be determined that the second one or more users are using the shared resource with a first probability. As the second one or more users are users who are both allocated to the shared resource and are proximate to the usage location of the shared resource, the first probability, $p_1$, may be a high probability, e.g. the first probability may be greater than or equal to 0.9 (90%), e.g. greater than or equal to 0.95 (95%) or greater than or equal to 0.99 (99%). An expectation of the number of the second one or more users that are using the shared resource may be calculated using the first probability, e.g. the number of the second one or more users using the shared resource may be calculated as $p_1 N_2$ where $N_2$ is the count of the second one or more users.

The step 520 may include a step 526 of determining whether a second one or more client devices of the plurality of client devices are proximate to a usage location of the shared resource. The second one or more client devices are client devices of a third one or more users. The third one or more users are or comprise users that are one or more users other than the first one or more users and/or one or more unidentifiable users.

The step 520 may include a step 528 of determining that the third one or more users are using the shared resource in response to determining that the second one or more client devices are proximate to the usage location of the shared resource. It may be determined that the third one or more users are using the shared resource with a second probability. As the third one or more users either have not been allocated to the shared resource or are unidentifiable, the second probability, $p_2$, may be lower than the first probability, e.g. the first probability may be lower than or equal to 0.8 (80%), e.g. less than or equal to 0.75 (75%) or greater than or equal to 0.6 (60%). An expectation of the number of the third one or more users that are using the shared resource may be calculated using the second probability, e.g. the number of the second one or more users using the shared resource may be calculated as $p_2 N_3$ where $N_3$ is the count of the third one or more users.

In some embodiments, unidentifiable users and identified users that have not been allocated to the shared resource may be treated distinctly. For example, the third one or more users and the second probability may relate to unidentifiable users, and there may be a fourth one or more users which are users that are identified but have not been allocated to the shared resource and an associated third probability $p_3$ of the fourth one or more users using the shared resource. The third probability $p_3$ may be lower than $p_2$ as the identity of these users is known and it is known that the shared resource is not allocated to them, e.g. the third probability may be less than or equal to 0.5 (50%), e.g. less than or equal to 0.4 (40%) or less than or equal to 0.3 (30%). An expectation of the number of the fourth one or more users that are using the shared resource may be calculated using the third probability, e.g. the number of the third one or more users using the shared resource may be calculated as $p_3 N_4$ where $N_4$ is the count of the fourth one or more users.

A total number of users of the shared resource may be calculated as the sum of the count of the second one or more users and the count of the third one or more users e.g. as $N_2+N_3$. Using this approach to calculate the number of users of the shared resource may increase the accuracy of the count as compared to solely using the location. The probability of an accurate count may be calculated as follows:

$$\frac{N_2}{N_2+N_3} p_0 p_1 + \frac{N_3}{N_2+N_3} p_2$$

where $p_0$ is the probability of the shared resource having a scheduled allocation. $p_0$ is likely to be high in many organizations as shared resources will typically have to be reserved. Assuming a value for $p_0$ of 0.9, a value for $p_1$ of 0.95 (e.g. a probability of the count of the second one or more users being accurate), a value of $p_2$ of 0.7 (e.g. a probability of the count of the third one or more users being accurate), a value of $$\frac{N_2}{N_2+N_3}$$

of 0.75 and a value of $$\frac{N_3}{N_2+N_3}$$

of 0.25 then the probability of an accurate count would be 0.75×0.9×0.95+0.25×0.7=0.82 (82%). This is comparable to the results achieved using specialized sensing hardware but does not require such specialized sensors, and is considerably greater than the accuracy of 0.7 (70%) achieved using the wireless signals alone.

The sum may include the count of the fourth one or more users in the relevant embodiments with similar reasoning applying as to the accuracy.

The number of users of the shared resource may be calculated as an expectancy (e.g. an expected number of users) based on a count of the second one or more users, the first probability, a count of the third one or more users and the second probability. For example, the total number of users of the shared resource may be calculated as:

$p_1 N_2 + p_2 N_3$

The expectancy may include the count of the fourth one or more users and the third probability for the relevant embodiments.

Using the expectancy may further improve the accuracy of the calculation of the number of users of the shared resource.

Accurately determining the number of users of a given shared resource with an associated scheduled allocation may also enhance calculating the number of users of other resources. If it is known that there are a total number of users present in an overarching area including the shared resource, and users that are using the shared resource cannot be using other resources in the overarching area, then the remaining number of users that may be using the other resources can be more accurately determined if the number of users using the shared resource can be more accurately determined. For example, if it is known that there are 30 users in an area consisting of two meeting rooms and it can be accurately calculated that there are 12 users of one of the meeting rooms based on a scheduled allocation of this meeting then it can be accurately inferred that there are 18 users of the other of the meetings rooms.

The calculation of the number of users of the shared resource may include counting the number of client devices whose determined locations are at or within a predetermined distance of the shared resource.

At optional step 530, it is determined whether the number of users of the shared resource exceeds or is at a threshold. The threshold may be the capacity of the shared resource.

At optional step 540, an indication that the number of users is at or exceeds the threshold is provided in response to determining that the number of users is at or exceeds the threshold. The indications may be provided to one of the client devices of the users of the shared resource, and/or may be provided to a client device of another user, e.g. a manager of the shared resource such as a facilities manager. The indication may be provided as a message and/or notification to the client device, e.g. an SMS or other messaging service message may be sent to the client device and/or a push notification may be sent to the client device and displayed on the client device by an app and/or notification facility of the client device. Alternatively or additionally, the indication may be provided by activating notification hardware associated with the shared resource, e.g. a light, speaker and/or display associated with the resource. For example, an audio and/or visual alarm may sound when the threshold has been exceeded.

Location Estimation Calibration Method

Figure 6:
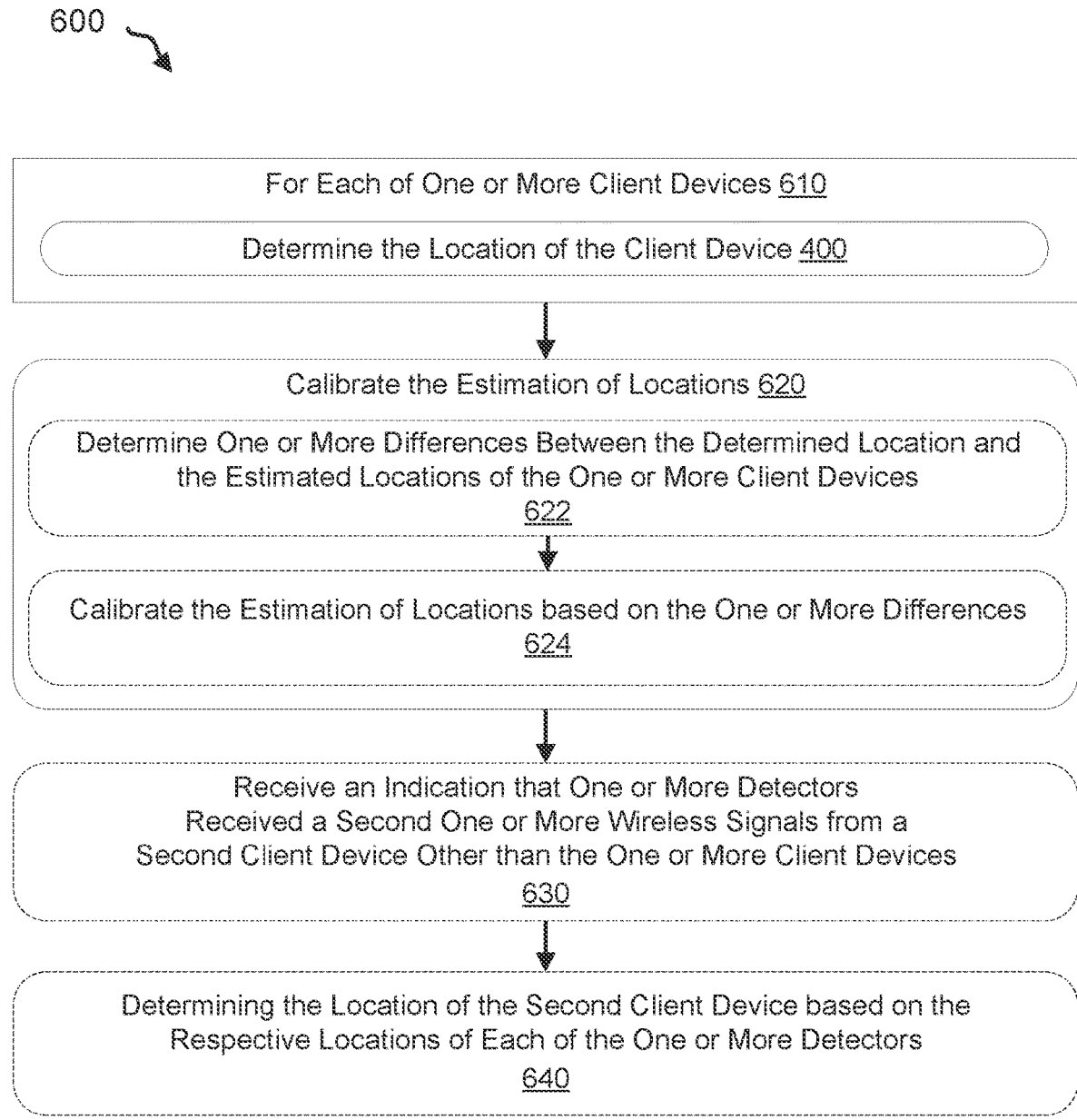
FIG. 6 shows a method for calibrating the estimation of locations in accordance with an embodiment.

FIG. 6 illustrates an example method 600 for calibrating the estimations of locations in accordance with an embodiment. The example method 500 may be implemented as one or more computer-executable instructions executed on one or more computing devices, e.g. one or more instance of the computing device 700 described in relation to FIG. 7. The example method may be performed by the one or more computing devices 130 described with respect to FIG. 1. Optional steps are indicated via dashed lines.

At step 610, the steps of the method 400 are repeated for each of one or more client devices to determine the location of each client device.

At step 620, the estimation of locations is calibrated.

Step 620 may include an optional step 622 of determining one or more differences between the determined location and the estimated locations of the one or more client devices.

The one or more differences may be calculated using any suitable metric. For example, the one or more differences may include or be calculated based on the Euclidean distances between the determined locations and the estimated locations of the one or more client devices. Where there are a plurality of client devices, the one or more differences may be or include an average of the Euclidean distances between the determined locations and the estimated locations of the one or more client devices. A weighted average may be used for determining the difference, e.g. a weighted average based on the precision with which the determined location is known and/or the confidence in the determined location, which may be higher in certain situations, e.g. if the user of the client device has confirmed their usage of the resource.

Step 620 may include a further optional step 624 of calibrating the estimation of locations based on the one or more differences.

Calibrating the estimation of the location of client devices may include adjusting one or more parameters used in the estimation of locations. These one or more parameters may mediate the relationship between the properties of the wireless signals, e.g. the values of the parameters of electromagnetic radiation received by the detectors, and/or the estimated location. Thus, by adjusting these parameters, the estimated location of a client device for given properties of the wireless signals may be changed. To calibrate the estimation of the location of client devices, the parameters may be adjusted to minimize or at least reduce the one or more differences, e.g. to minimize or at least reduce the difference between the estimated location and the determined location.

At optional step 630, an indication is received. The indication indicating that one or more detectors received a second one or more wireless signals from a second client device other than the one or more client devices.

At optional step 640, the location of the second client device is determined based on the respective locations of each of the one or more detectors. The determination of the location of the client devices may use any of the same techniques or methods as described in relation to the estimation of the location of a client device in steps 414-418 of FIG. 4. Due to the calibration, the precision and accuracy provided by such methods may be sufficient to be used as a determination of the location of the second client device rather than as an estimation.

Computing Device

Figure 7:
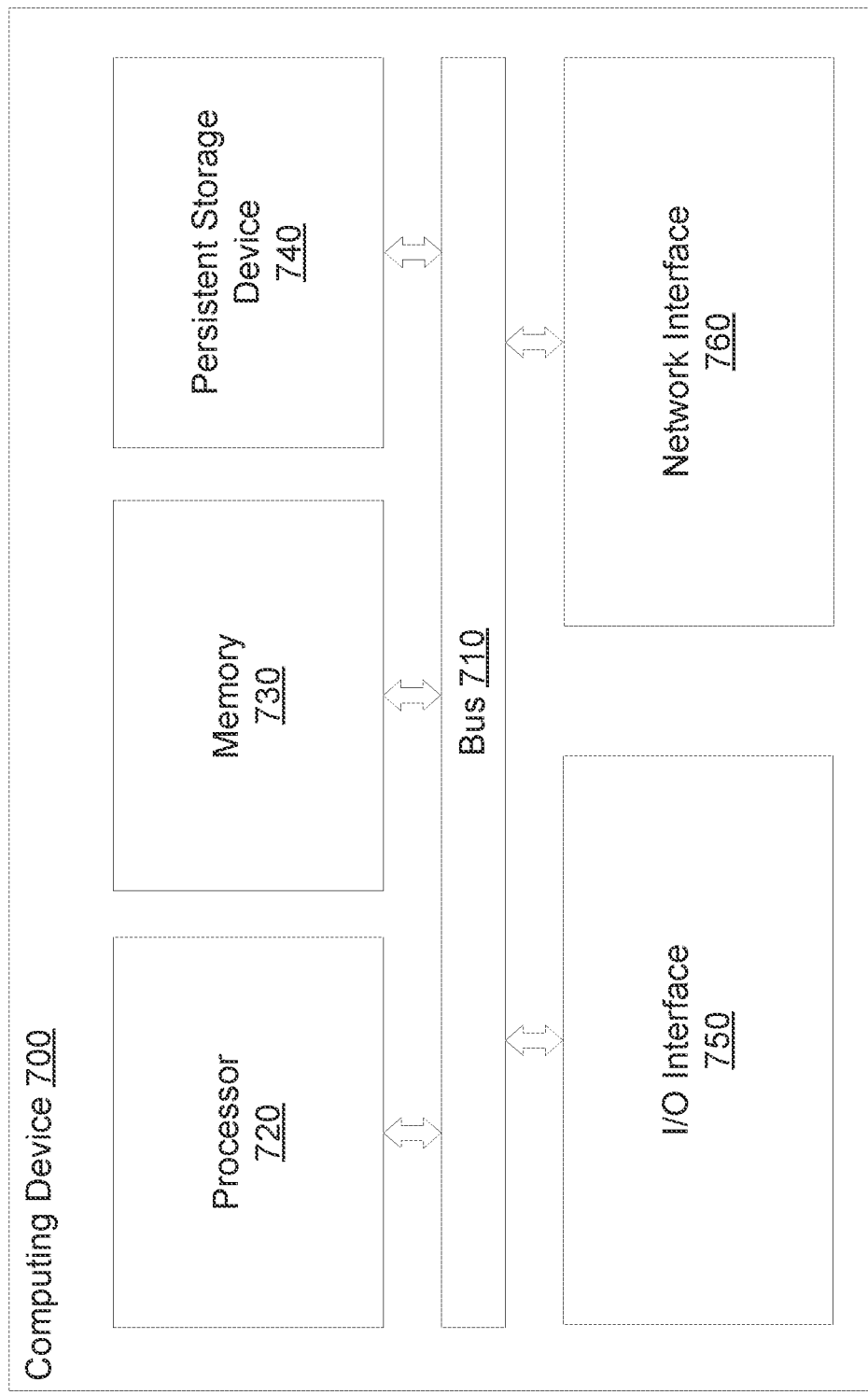
FIG. 7 shows a computing device using which the embodiments described herein may be implemented.

FIG. 7 shows a computing device 700 using which the embodiments described herein may be implemented.

The computing device 700 includes a bus 710, a processor 720, a memory 730, a persistent storage device 740, an Input/Output (I/O) interface 770, and a network interface 760.

The bus 710 interconnects the components of the computing device 700. The bus may be any circuitry suitable for interconnecting the components of the computing device 700. For example, where the computing device 700 is a desktop or laptop computer, the bus 710 may be an internal bus located on a computer motherboard of the computing device. As another example, where the computing device 700 is a smartphone or tablet, the bus 710 may be a global bus of a system on a chip (SoC).

The processor 720 is a processing device configured to perform computer-executable instructions loaded from the memory 730. Prior to and/or during the performance of computer-executable instructions, the processor may load computer-executable instructions over the bus from the memory 730 into one or more caches and/or one or more registers of the processor. The processor 720 may be a central processing unit with a suitable computer architecture, e.g. an x86-64 or ARM architecture. The processor 720 may include or alternatively be specialized hardware adapted for application-specific operations.

The memory 730 is configured to store instructions and data for utilization by the processor 720. The memory 730 may be a non-transitory volatile memory device, such as a random access memory (RAM) device. In response to one or more operations by the processor, instructions and/or data may be loaded into the memory 730 from the persistent storage device 740 over the bus, in preparation for one or more operations by the processor utilizing these instructions and/or data.

The persistent storage device 740 is a non-transitory non-volatile storage device, such as a flash memory, a solid state disk (SSD), or a hard disk drive (HDD). A non-volatile storage device maintains data stored on the storage device after power has been lost. The persistent storage device 740 may have a significantly greater access latency and lower bandwidth than the memory 730, e.g. it may take significantly longer to read and write data to/from the persistent storage device 740 than to/from the memory 730. However, the persistent storage 740 may have a significantly greater storage capacity than the memory 730.

The I/O interface 750 facilitates connections between the computing device and external peripherals. The I/O interface 750 may receive signals from a given external peripheral, e.g. a keyboard or mouse, convert them into a format intelligible by the processor 720 and relay them onto the bus for processing by the processor 720. The I/O interface 750 may also receive signals from the processor 720 and/or data from the memory 730, convert them into a format intelligible by a given external peripheral, e.g. a printer or display, and relay them to the given external peripheral.

The network interface 760 facilitates connections between the computing device and one or more other computing devices over a network. For example, the network interface 760 may be an Ethernet network interface, a Wi-Fi network interface, or a cellular network interface.

Implementations of the subject matter and the operations described in this specification can be realized in digital electronic circuitry, or in computer software, firmware, or hardware, including the structures disclosed in this specification and their structural equivalents, or in combinations of one or more of them. For instance, hardware may include processors, microprocessors, electronic circuitry, electronic components, integrated circuits, etc. Implementations of the subject matter described in this specification can be realized using one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

While certain arrangements have been described, the arrangements have been presented by way of example only, and are not intended to limit the scope of protection. The inventive concepts described herein may be implemented in a variety of other forms. In addition, various omissions, substitutions and changes to the specific implementations described herein may be made without departing from the scope of protection defined in the following claims.

The invention claimed is:

1. A system for determining a location of one or more client devices, comprising:
    a plurality of detectors for detecting the presence of one or more client devices based on wireless signals received from the one or more client devices, wherein each of the plurality of detectors is mapped to a respective location; and
    one or more computing devices configured to:
        determine the respective location of each of the one or more client devices at a given time, comprising, for each of the one or more client devices:
        estimating a location of a client device of the one or more client devices at the given time, comprising:
            determining whether one or more of the plurality of detectors received one or more wireless signals from the client device at the given time; and
            in response to determining that the one or more detectors received the one or more wireless signals at the given time, estimating the location of the client device at the given time based on the respective locations of the one or more detectors;
        obtaining an indication of a predefined scheduled allocation of one or more resources at the given time or within a predetermined range of the given time, wherein the scheduled allocation indicates a usage location of the one or more resources;
        determining whether the estimated location of the client device is proximate to the usage location of the one or more resources; and
        in response to determining that the estimated location of the client device is proximate to the usage location, determining the location of the client device at the given time based on the usage location, wherein the locations of the client device is an indoor location.

2. The system of claim 1, wherein the scheduled allocation of the one or more resources is to a user of the client device.

3. The system of claim 1, wherein the one or more resources comprise a shared resource, and wherein the one or more computing devices are further configured to:
    calculate a number of users of the shared resource based on the determined locations of the one or more client devices,
    wherein the shared resource comprises any of:
    a material resource for a meeting;
    a room;
    a space;
    an event location;
    a workspace;
    a computing device;
    a gymnasium space;
    machinery; or
    equipment.

4. The system of claim 3, wherein the scheduled allocation is to a plurality of users, wherein at least one of the one or more client devices is associated with a respective at least one of the plurality of users.

5. The system of claim 1, wherein the one or more computing devices are further configured to:
    calibrate the estimation of locations of client devices based on the determined respective locations for the one or more client devices.

6. The system of claim 5, wherein calibrating the estimations of locations comprises:
    determining one or more differences between the determined locations and the estimated locations of the one or more client devices; and
    updating one or more parameters utilised when determining the estimated locations based on the one or more differences to calibrate the estimation of locations.

7. The system of claim 1, wherein estimating the location of the client device, comprises:
    measuring first values of one or more electromagnetic radiation parameters of the one or more wireless signals received from the client device by at least one of the plurality of detectors,
    wherein estimating the location of the client device is based on the first values.

8. The system of claim 7, wherein estimating the location of at least one of the one or more client devices comprises:
    measuring second values of one or more parameters of electromagnetic radiation received from the client device by a second at least one of the plurality of detectors, and wherein estimating the location of the client device is further based on the second values.

9. A computer-implemented method for determining a location of one or more client devices, the method being performed by one or more computing devices, the method comprising:
    determining a respective location of each of the one or more client devices at a given time, comprising, for each of the one or more client devices:
        estimating a location of a client device of the one or more client devices at the given time, comprising:
            receiving an indication that one or more detectors of a plurality of detectors received one or more wireless signals from the client device at the given time, wherein each of the plurality of detectors is mapped to a respective location; and
            estimating the location of the client device at the given time based on the respective locations of each of the one or more detectors;
        obtaining an indication of a predefined scheduled allocation of one or more resources at the given time or within a predetermined range of the given time, wherein the scheduled allocation indicates a usage location of the one or more resources;
        determining whether the estimated location of the client device is proximate to the usage location of the one or more resources; and
        in response to determining that the estimated location of the client device is proximate to the usage location, determining the location of the client device at the given time based on the usage location, wherein the location of the client device is an indoor location.

10. The method of claim 9, further comprising:
calibrating the estimation of locations of the one or more client devices based on the determined locations of the one or more client devices.

11. The method of claim 10, wherein calibrating the estimation of locations of the one or more client devices comprises:
determining one or more differences between the determined locations and the estimated locations of the one or more client devices; and
updating one or more parameters utilised when determining the estimated locations based on the one or more differences to calibrate the estimation of locations.

12. The method of claim 10, further comprising:
receiving an indication that a further one or more detectors of the plurality of detectors received a second one or more wireless signals from a second client device other than the one or more client devices; and
determining the location of the second client device based on the respective locations of each of the one or more detectors.

13. The method of claim 9, wherein the one or more resources comprise a shared resource, and wherein the method further comprises:
calculating a number of users of the shared resource at the given time based on the determined locations of the one or more client devices,
wherein the determined locations of the one or more client devices are indoor locations, and wherein the shared resource comprises any of:
a material resource for a meeting;
a room;
a space;
an event location;
a workspace;
a computing device;
a gymnasium space;
machinery; or
equipment.

14. The method of claim 13, wherein the one or more client devices comprise a plurality of client devices, wherein the scheduled allocation is to a plurality of users, wherein at least one of the plurality of client devices is associated with a respective first one or more users of the plurality of users, and wherein calculating the number of the users of the shared resource comprises:
determining whether a first one or more client devices of the plurality of client devices are proximate to a usage location of the shared resource, wherein the first one or more client devices are client devices of a second one or more users of the first one or more users; and
in response to determining that the first one or more client devices are proximate to the usage location of the shared resource, determining that the second one or more users are using the shared resource.

15. The method of claim 13, wherein the one or more client devices comprise a plurality of client devices, wherein the scheduled allocation is to a plurality of users, wherein at least one of the plurality of client devices is associated with a respective a first one or more users of the plurality of users, and wherein calculating the number of users of the shared resource comprises:
determining whether a second one or more client devices of the plurality of client devices are proximate to a usage location of the shared resource, wherein the second one or more client devices are client devices of a third one or more users, wherein the third one or more users comprise one or more users other than the first one or more users and/or one or more unidentifiable users; and
in response to determining that the second one or more client devices are proximate to the usage location of the shared resource, determining that the third one or more users are using the shared resource.

16. The method of claim 13, wherein calculating the number of users of the shared resource comprises calculating an expected value for the number of users based on a probability of a first one or more users using the shared resource at the given time and a probability of a second one or more users using the shared resource at the given time.

17. The method of claim 13, wherein the calculation of the number of users of the shared resource is based on a prior probability distribution for the number of users of the shared resource.

18. The method of claim 13, wherein the calculation of the number of users of the shared resource is based on a prior probability that the estimated locations of the one or more client devices are proximate to the usage location of the shared resource at or within the predetermined interval of the given time.

19. The method of claim 13, wherein the method further comprises:
determining whether the number of users of the shared resource exceeds or is at a threshold; and
in response to determining that the number of users exceeds or is at the threshold, providing an indication that the number of users exceeds or is at the threshold.

20. The method of claim 13, wherein the estimated or determined locations of the plurality of the client devices are stored in volatile memory.

* * * * *